United States Patent
Onuki

(10) Patent No.: US 7,456,877 B2
(45) Date of Patent: Nov. 25, 2008

(54) IMAGE SENSING APPARATUS, CONTROL METHOD THEREFOR, AND PRINTER

(75) Inventor: Ichiro Onuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 10/995,371

(22) Filed: Nov. 24, 2004

(65) Prior Publication Data
US 2005/0146639 A1 Jul. 7, 2005

(30) Foreign Application Priority Data
Nov. 28, 2003 (JP) .............................. 2003-399746

(51) Int. Cl.
*H04N 5/217* (2006.01)
*H04N 5/228* (2006.01)
*H04N 5/222* (2006.01)
*G03B 15/03* (2006.01)

(52) U.S. Cl. ............... 348/241; 348/222.1; 348/333.01; 348/333.02; 348/333.04; 348/333.05; 396/158

(58) Field of Classification Search ................ 396/158; 348/207.2, 371, 333.01, 222.1, 241, 333.02, 348/333.04, 333.05; 358/1.6, 3.26, 3.27
See application file for complete search history.

(56) References Cited

U.S. PATENT DOCUMENTS

| | | | | |
|---|---|---|---|---|
| 5,206,678 | A * | 4/1993 | Kazumi | 396/130 |
| 5,526,090 | A * | 6/1996 | Fukuhara et al. | 396/158 |
| 6,029,012 | A * | 2/2000 | Miyamoto et al. | 396/158 |
| 6,285,410 | B1 * | 9/2001 | Marni | 348/576 |
| 6,597,468 | B1 * | 7/2003 | Inuiya | 358/1.15 |
| 6,631,208 | B1 | 10/2003 | Kinjo et al. | 382/167 |
| 2001/0012450 | A1 * | 8/2001 | Wakui | 396/298 |
| 2002/0109854 | A1 * | 8/2002 | Murray et al. | 358/1.9 |
| 2002/0172419 | A1 * | 11/2002 | Lin et al. | 382/167 |
| 2002/0181765 | A1 | 12/2002 | Mori et al. | 382/158 |
| 2003/0068084 | A1 * | 4/2003 | Kinjo et al. | 382/164 |
| 2003/0202105 | A1 * | 10/2003 | Gaubatz et al. | 348/207.99 |
| 2004/0041924 | A1 * | 3/2004 | White et al. | 348/239 |
| 2004/0090653 | A1 * | 5/2004 | Grimsey | 358/1.18 |
| 2004/0114796 | A1 * | 6/2004 | Kaku | 382/165 |

FOREIGN PATENT DOCUMENTS

| | | | |
|---|---|---|---|
| JP | 10-091761 A | 4/1998 |
| JP | 10-233929 A | 9/1998 |
| JP | 11-12371 A | 1/1999 |
| JP | 11-175699 A | 7/1999 |
| JP | 11-341279 A | 12/1999 |
| JP | 2000-13680 A | 1/2000 |
| JP | 2000-305141 A | 11/2000 |
| JP | 2001-148780 A | 5/2001 |
| JP | 2002-358500 A | 12/2002 |

* cited by examiner

*Primary Examiner*—David L Ometz
*Assistant Examiner*—Wanda M Negron
(74) *Attorney, Agent, or Firm*—Fitzpatrick, Cella, Harper & Scinto

(57) ABSTRACT

In an image sensing apparatus having an electronic flash that illuminates an object and an image sensor that acquires an image of the object as an image signal, whether to perform a process regarding pink-eye correction for the image of the object acquired by the image sensor is selected before image sensing. The process regarding pink-eye correction is performed for the image of the object in accordance with the selection result. Process result regarding pink-eye correction is displayed together with the image of the object before pink-eye correction or the image of the object after pink-eye correction.

6 Claims, 18 Drawing Sheets

ELECTRONIC FLASH
PINK-EYE CORRECTION
IMAGE PLAYBACK
IMAGE RECORDING

FIG. 5B

ELECTRONIC FLASH ─┬─ AUTOMATIC FLASHING ─┬─ WITH PINK-EYE MITIGATION
                  │                      └─ NO PINK-EYE MITIGATION
                  ├─ FORCIBLE FLASHING ─┬─ WITH PINK-EYE MITIGATION
                  │                     └─ NO PINK-EYE MITIGATION
                  └─ FLASHING INHIBITION

PINK-EYE CORRECTION
IMAGE PLAYBACK
IMAGE RECORDING

FIG. 5C

ELECTRONIC FLASH
PINK-EYE CORRECTION ─┬─ INTRA-CAMERA CORRECTION
                     ├─ INTRA-PRINTER CORRECTION
                     └─ CORRECTION INHIBITION
IMAGE PLAYBACK
IMAGE RECORDING

FIG. 5D

ELECTRONIC FLASH
PINK-EYE CORRECTION
IMAGE PLAYBACK ─┬─ ONLY ORIGINAL IMAGE
                ├─ ORIGINAL IMAGE OR CORRECTED IMAGE
                └─ ORIGINAL IMAGE AND CORRECTED IMAGE
IMAGE RECORDING

FIG. 5E

ELECTRONIC FLASH
PINK-EYE CORRECTION
IMAGE PLAYBACK
IMAGE RECORDING ─┬─ ONLY ORIGINAL IMAGE
                 ├─ ORIGINAL IMAGE OR CORRECTED IMAGE
                 └─ ORIGINAL IMAGE AND CORRECTED IMAGE

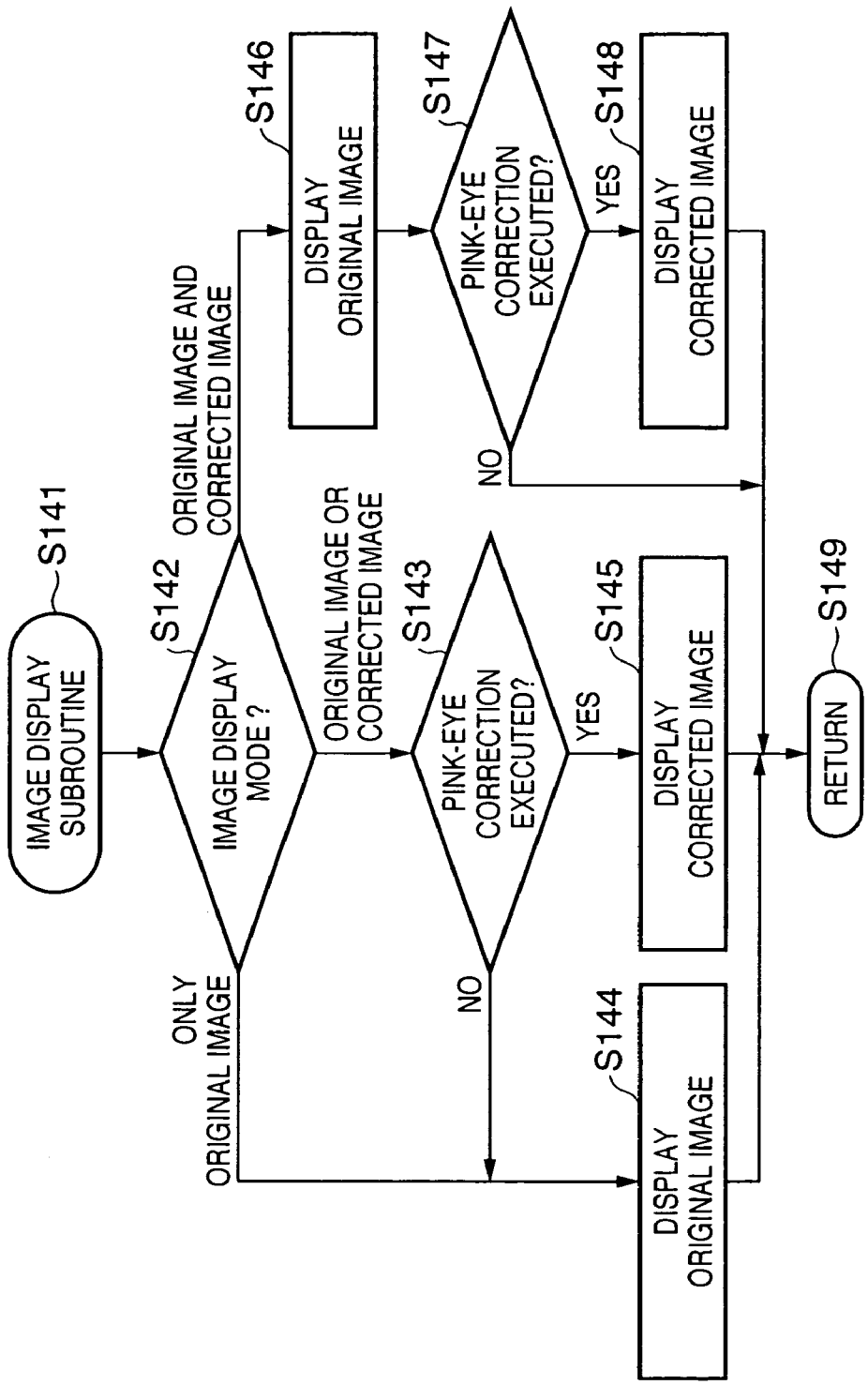

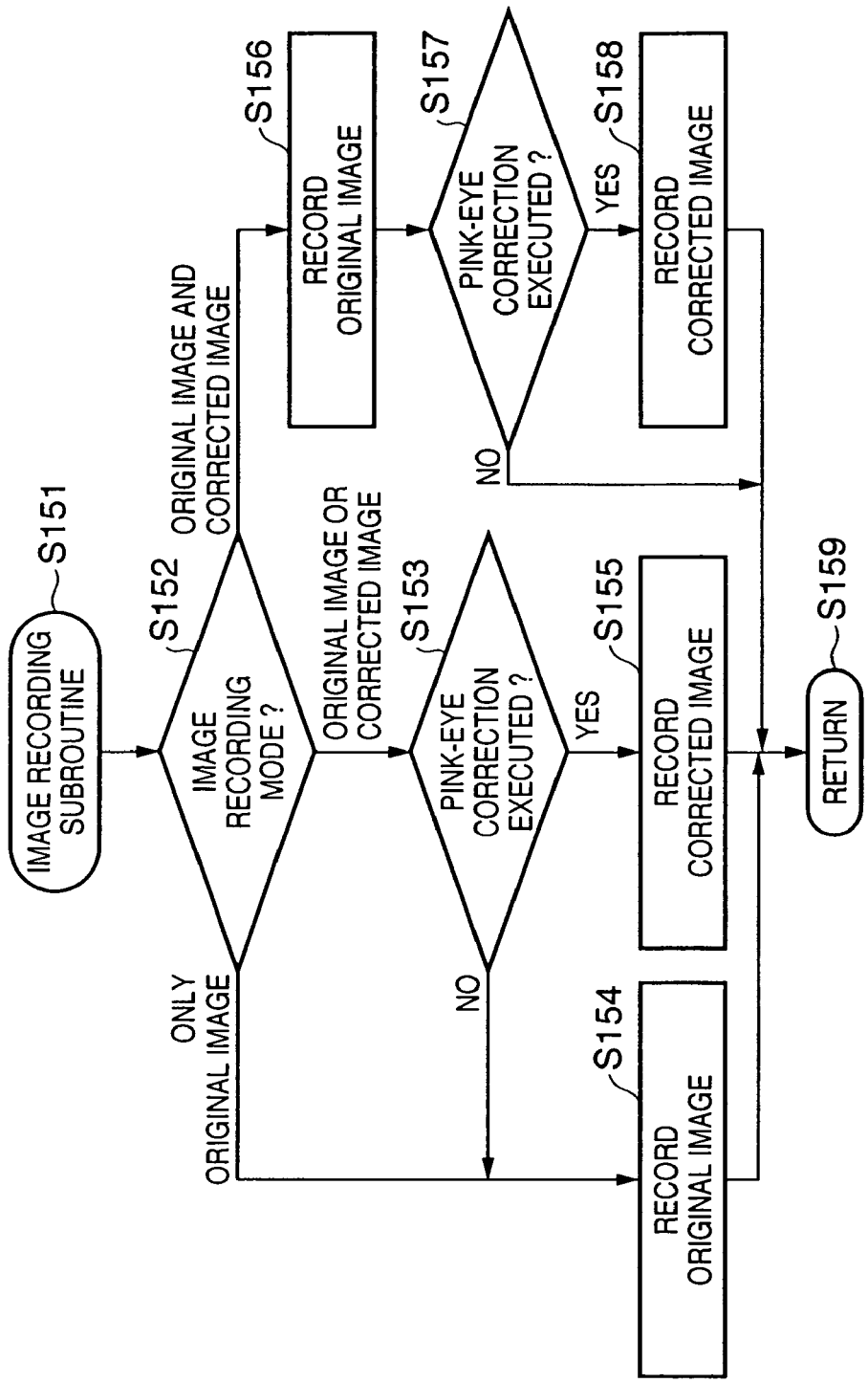

FIG. 12A

IMA_00001.JPG

| TAG NAME | INFORMATION |
|---|---|
| VERSION | |
| ... | |
| IMAGE DATA CHARACTERISTIC | |
| ... | |
| USER INFORMATION MAKER'S NOTE PINK-EYE CORRECTION | |
| PINK-EYE DETECTION SOFTWARE | PinkEyeD_Cm_1.1 |
| NUMBER OF PINK EYE-DETECTED PERSONS | 1 |
| RELIABILITY | 0.95 |
| PINK-EYE CORRECTION SOFTWARE | NONE |
| NUMBER OF PINK EYE-CORRECTED PERSONS | NONE |
| RELIABILITY | NONE |
| TYPE OF IMAGE | ORIGINAL IMAGE |
| PRESENCE/ABSENCE OF RELEVANT IMAGE | CORRECTED IMAGE EXISTS |

FIG. 12B

IMB_00001.JPG

| TAG NAME | INFORMATION |
|---|---|
| VERSION | |
| ... | |
| IMAGE DATA CHARACTERISTIC | |
| ... | |
| USER INFORMATION MAKER'S NOTE PINK-EYE CORRECTION | |
| PINK-EYE DETECTION SOFTWARE | PinkEyeD_Cm_1.1 |
| NUMBER OF PINK EYE-DETECTED PERSONS | 1 |
| RELIABILITY | 0.95 |
| PINK-EYE CORRECTION SOFTWARE | PinkEyeA_Cm_1.1 |
| NUMBER OF PINK EYE-CORRECTED PERSONS | 1 |
| RELIABILITY | 0.85 |
| TYPE OF IMAGE | PINK-EYE CORRECTED |
| PRESENCE/ABSENCE OF RELEVANT IMAGE | ORIGINAL IMAGE EXISTS |

FIG. 13A
DPOF
CAMERA DIRECT PRINT
ERASE

FIG. 13B
DPOF — IMAGE DESIGNATION
 ├ ONLY ORIGINAL IMAGE
 ├ ORIGINAL IMAGE OR CORRECTED IMAGE
 ├ ORIGINAL IMAGE AND CORRECTED IMAGE
 └ INDIVIDUAL DESIGNATION
CAMERA DIRECT PRINT
ERASE

FIG. 13C
DPOF — OUTPUT FORMAT
 ├ Standard
 ├ Index
 └ BOTH
CAMERA DIRECT PRINT
ERASE

FIG. 13D
DPOF
CAMERA DIRECT PRINT — IMAGE DESIGNATION
 ├ ONLY ORIGINAL IMAGE
 ├ ORIGINAL IMAGE OR CORRECTED IMAGE
 ├ ORIGINAL IMAGE AND CORRECTED IMAGE
 └ INDIVIDUAL DESIGNATION
ERASE

FIG. 13E
DPOF
CAMERA DIRECT PRINT — OUTPUT FORMAT
 ├ L
 ├ 2L
 ├ Card
 └ A4 Index
ERASE

FIG. 13F
DPOF
CAMERA DIRECT PRINT
ERASE — ORIGINAL IMAGES/BATCH
 ├ CORRECTED IMAGES/BATCH
 ├ ALL IMAGES/BATCH
 └ INDIVIDUAL ERASE

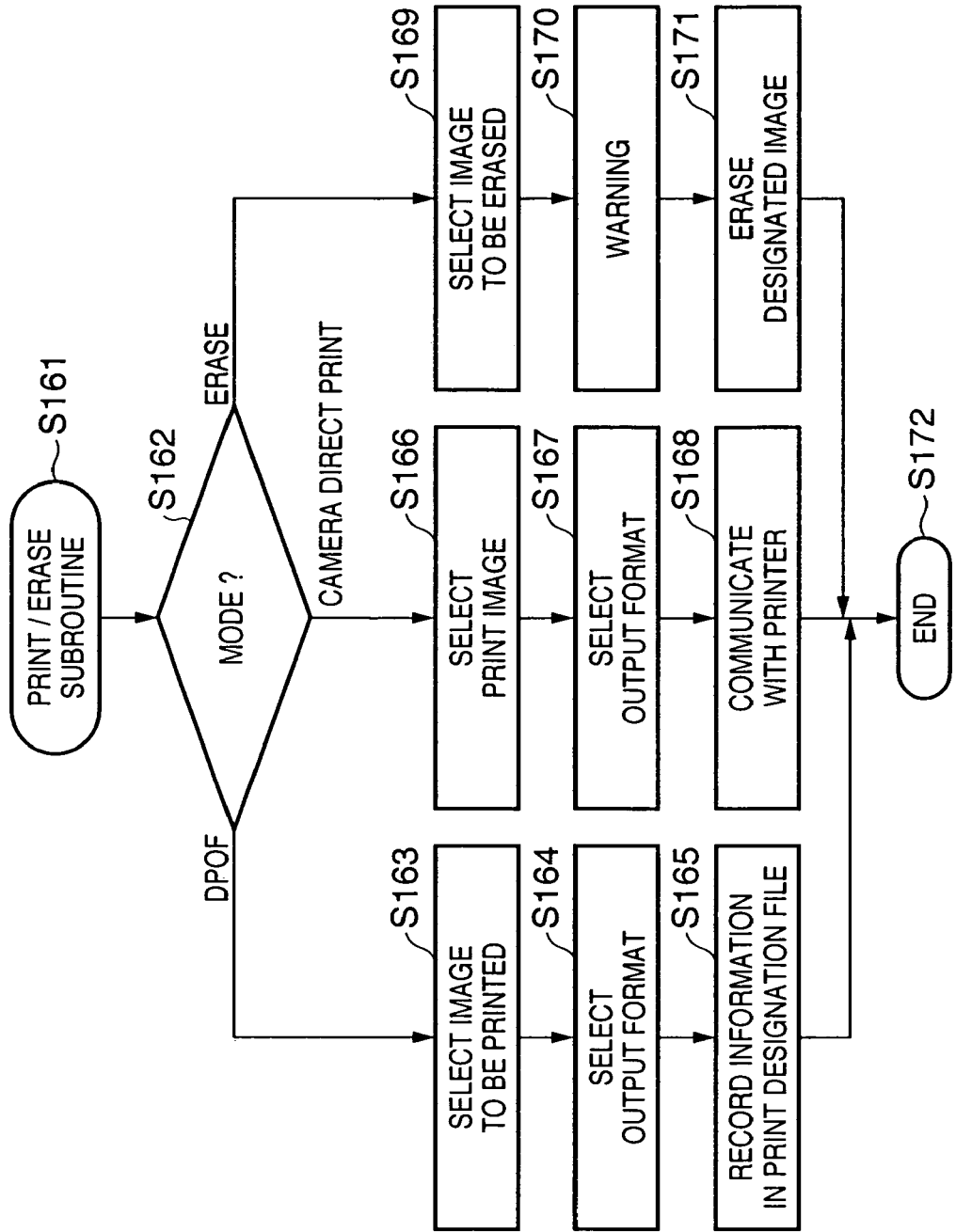

FIG. 15A

| | | | | |
|---|---|---|---|---|
| IMAGE CONFIRMATION RESULT | ONLY ORIGINAL IMAGE | | CORRECTED IMAGE EXISTS | |
| | ************************************ | | | |
| MODE | DPOF | | Camera Direct | |
| | CD-R/PC-Memory | | | |
| PINK-EYE CORRECTION | CORRECT | NOT CORRECT | AUTOMATICALLY SELECT | |
| PRINT IMAGE | ONLY ORIGINAL IMAGE | | | |
| | ORIGINAL IMAGE OR CORRECTED IMAGE | | | |
| | ORIGINAL IMAGE AND CORRECTED IMAGE | | | |
| | INDIVIDUAL DESIGNATION | | | |
| | DESIGNATED | | | |
| PINK-EYE CORRECTION LOG SHEET | PRINT | | NOT PRINT | |
| | L | 2L | Card | A4 |
| LAYOUT | ▯ | ▯▯ | ▦ | INDEX |
| QUALITY | ☆ | ☆☆ | ☆☆☆ | |
| DATE | PRINT | | NOT PRINT | |

- 186
- 185-1 (power)
- 185-2
- 185-3 START PRINT
- 185-4 STOP PRINT
- 185

FIG. 15B

| | | | | |
|---|---|---|---|---|
| IMAGE CONFIRMATION RESULT | ONLY ORIGINAL IMAGE | | CORRECTED IMAGE EXISTS | |
| | ************************************ | | | |
| MODE | [DPOF] | | Camera Direct | |
| | CD-R/PC-Memory | | | |
| PINK-EYE CORRECTION | CORRECT | NOT CORRECT | AUTOMATICALLY SELECT | |
| PRINT IMAGE | ONLY ORIGINAL IMAGE | | | |
| | ORIGINAL IMAGE OR CORRECTED IMAGE | | | |
| | ORIGINAL IMAGE AND CORRECTED IMAGE | | | |
| | INDIVIDUAL DESIGNATION | | | |
| | DESIGNATED | | | |
| PINK-EYE CORRECTION LOG SHEET | PRINT | | NOT PRINT | |
| | L | 2L | Card | A4 |
| LAYOUT | ▯ | ▯▯ | ▦ | INDEX |
| QUALITY | ☆ | ☆☆ | ☆☆☆ | |
| DATE | PRINT | | NOT PRINT | |

- 186
- 185-1
- 185-2
- 185-3 START PRINT
- 185-4 STOP PRINT
- 185

IMAGE SENSING APPARATUS, CONTROL METHOD THEREFOR, AND PRINTER

FIELD OF THE INVENTION

The present invention relates to an image sensing apparatus which corrects a red-eve effect (also referred to as a pink-eye effect) that sometimes occurs upon sensing a portrait using an electronic flash, a control method therefor, and a printer used together with the image sensing apparatus.

BACKGROUND OF THE INVENTION

When a person is sensed using an electronic flash, a so-called pink-eye effect in which his/her pupil is sensed in pink occurs. To prevent this pink-eye effect, various methods have conventionally been proposed.

For example, Japanese Patent Laid-Open No. 11-175699 discloses a technique of reading by a scanner an image recorded on a film, displaying the read image on a display at a low resolution, and when a region including the eye of the object person image is designated for pink-eye correction, displaying the designated region at a high resolution before or after the pink-eye correction process. This reference describes that this method improves the workability of pink-eye correction without decreasing the productivity of outputting an image by a digital photo printer.

Japanese Patent Laid-Open No. 11-341279 discloses a technique of, when an image recorded on a film is read by a scanner and a pink eye is detected from the read image and corrected, parallel-displaying a pink-eye image to be corrected and a reference image for correction on a display, thereby facilitating confirmation of the final quality of a corrected image, and increasing the pink-eye correction precision.

Japanese Patent Laid-Open No. 2000-13680 discloses a digital camera having an image processing apparatus which detects a pink eye contained in an image and corrects the pink eye to a predetermined color. Japanese Patent Laid-Open No. 2000-13680 describes a method in which automatic recognition and manual designation of a pink-eye region can be switched, and the recognized or designated pink-eye region is enlarged and displayed.

Japanese Patent Laid-Open No. 2000-305141 discloses a technique of detecting a pink eye contained in an image, emphatically displaying the pink eye on a display, and thereby ensuring the pink-eye correction precision without decreasing the pink-eye visibility even on the small-size display of a digital camera.

Japanese Patent Laid-Open No. 2001-148780 discloses a method in which, when an image recorded on a film is read by a scanner and a pink eye is detected from the read image and corrected, automatic recognition and manual designation of a pink-eye region can be switched, and the designated pink-eye region is enlarged and displayed.

Japanese Patent-Laid-Open No. 10-91761 discloses a method in which, when a pink eye contained in an image is detected and corrected, automatic correction and manual correction of the pink eye can be switched, and in automatic correction, a catchlight position and a color after correction are designated, and the pink eye is corrected with the designated color while the color tone is changed from the catchlight position toward the periphery of the eye, thereby realizing more natural pink-eye correction.

Japanese Patent Laid-Open No. 11-12371 discloses a camera system having an image processing apparatus which detects a pink eye contained in an image and corrects the pink eye to a predetermined color. Japanese Patent Laid-Open No. 11-12371 discloses a technique of storing together with an image a flag representing the possibility of occurrence of a pink eye upon image sensing/recording and a flag representing that pink-eye correction has been done after the pink eye is corrected, and in playing back images, not performing pink-eye correction on the basis of these flags for a pink eye-corrected image and an image which need not be corrected.

As described above, more appropriate pink-eye correction can be achieved by displaying an image during pink-eye correction and a pink eye-corrected image. However, only an image is displayed, and it cannot be determined whether pink-eye correction has accurately been done, pink-eye correction intentionally has not been executed, or pink-eye correction has been tried but is determined to be unnecessary.

SUMMARY OF THE INVENTION

The present invention has been made in consideration of the above situation, and has as its object to allow easily confirming execution/non-execution of pink-eye correction and the execution result of a pink-eye correction process.

According to the present invention, the foregoing object is attained by providing an image sensing apparatus comprising: an image sensor that acquires an image of an object as an image signal; an electronic flash unit that illuminates an object; a selection unit that selects before image sensing whether to perform a process regarding pink-eye correction for the image of the object acquired by the image sensor; a pink-eye correction unit that performs the process regarding pink-eye correction for the image of the object in accordance with a selection result by the selection unit; and a display unit that displays a process result regarding pink-eye correction together with the image of the object before pink-eye correction that is sensed by the image sensor or the image of the object after pink-eye correction processed by the pink-eye correction unit.

According to the present invention, the foregoing object is also attained by providing a method of controlling an image sensing apparatus having an electronic flash unit that illuminates an object and an image sensor that acquires an image of an object as an image signal, comprising: selecting before image sensing whether to perform a process regarding pink-eye correction for the image of the object acquired by the image sensor; performing the process regarding pink-eye correction for the image of the object in accordance with a result of the selection; and displaying a process result regarding pink-eye correction together with the image of the object before pink-eye correction that is sensed by the image sensor or the image of the object after pink-eye correction.

Further, the foregoing object is also attained by providing a printer which is used by being connected to an image sensing apparatus which comprises: an image sensor that acquires an image of an object as an image signal; an electronic flash unit that illuminates an object; a selection unit that selects before image sensing whether to perform a process regarding pink-eye correction for the image of the object acquired by the image sensor; a pink-eye correction unit that performs the process regarding pink-eye correction for the image of the object in accordance with a selection result by the selection unit; a display unit that displays a process result regarding pink-eye correction together with the image of the object before pink-eye correction that is sensed by the image sensor or the image of the object after pink-eye correction processed by the pink-eye correction unit; and a recording unit that holds the image of the object and the process result regarding pink-eye correction as additional information of the image of the object, the printer comprising a control unit that controls to print at least part of the additional information together with the image of the object held by the recording unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 5A to 5E are views for explaining an image sensing condition setting sequence regarding pink-eye correction in the image sensing apparatus according to the embodiment of the present invention;

FIG. 9 is a flowchart showing an image display subroutine in the image sensing apparatus according to the embodiment of the present invention;

FIG. 11 is a flowchart showing an image recording subroutine in the image sensing apparatus according to the embodiment of the present invention;

FIGS. 12A and 12B are views showing an example of additional information of an image in the image sensing apparatus according to the embodiment of the present invention;

FIGS. 13A to 13F are views for explaining an operation for image printing and erasure in the image sensing apparatus according to the embodiment of the present invention;

FIG. 14 is a flowchart showing an image print/erasure subroutine in the image sensing apparatus according to the embodiment of the present invention;

FIGS. 15A to 15D are views for explaining an operation method in the printer according to the embodiment of the present invention;

DETAILED DESCRIPTION OF THE PREFERRED EMBODIMENT

A preferred embodiment of the present invention will be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not limited to the embodiments described herein.

Figure 1A:
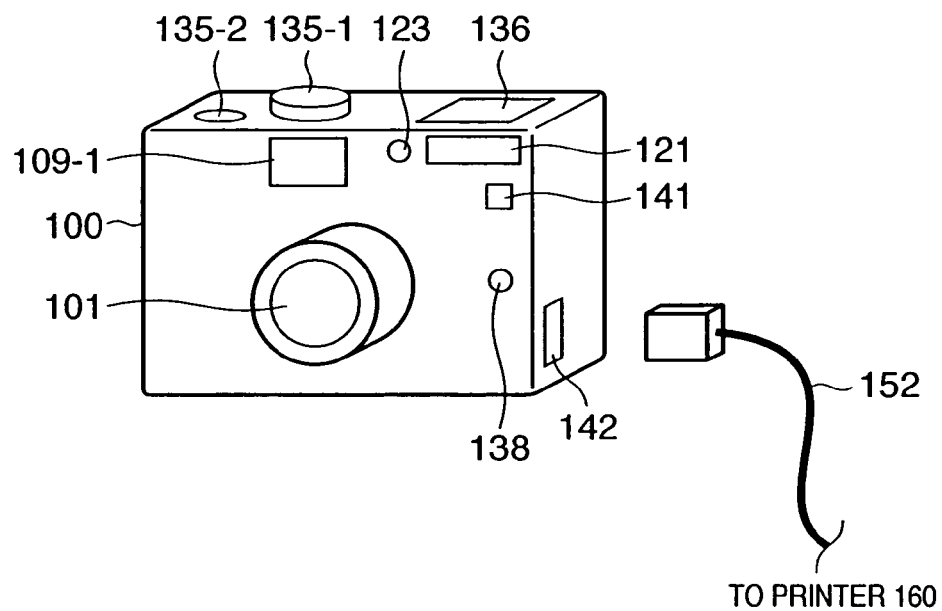
FIGS. 1A and 1B are perspective views showing an image sensing apparatus which forms an image sensing system according to an embodiment of the present invention.
Figure 1B:
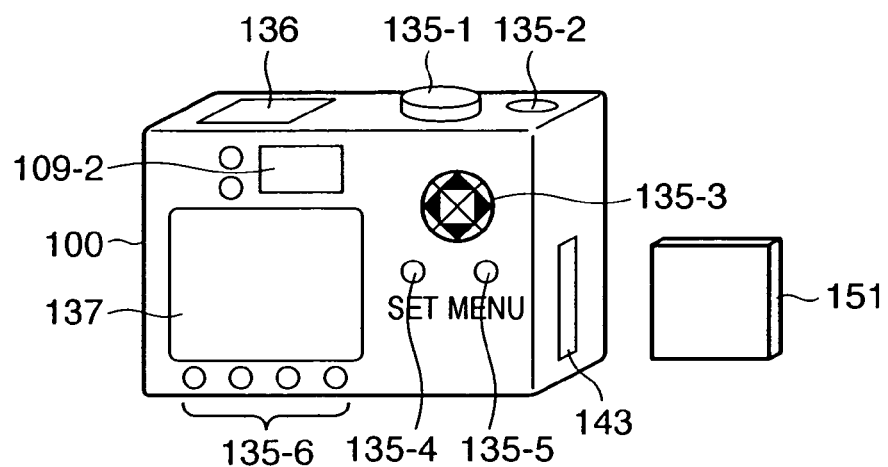
Figure 2:
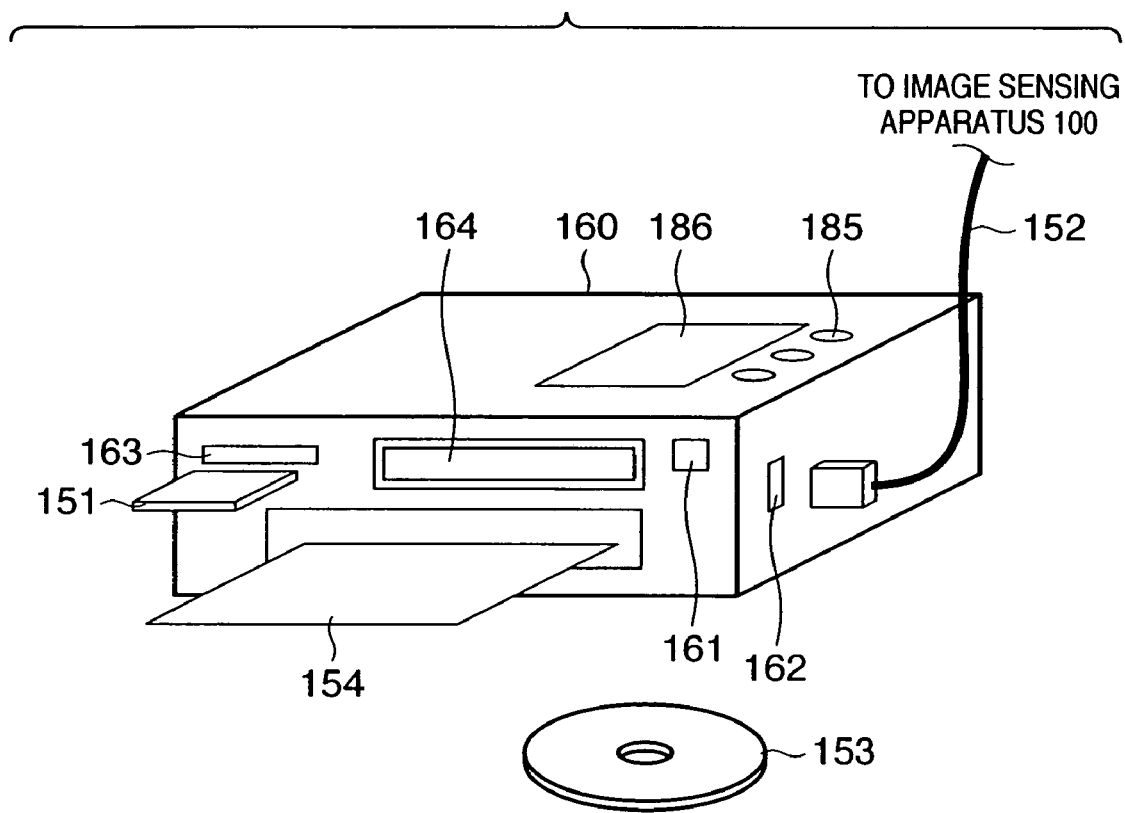
FIG. 2 is a perspective view showing a printer which forms the image sensing system according to the embodiment of the present invention.

FIGS. 1A and 1B are perspective views showing an image sensing apparatus which forms an image sensing system according to the embodiment of the present invention. FIG. 2 is a perspective view showing a printer which forms the image sensing system.

In FIGS. 1A and 1B, reference numeral 100 denotes an image sensing apparatus such as a digital camera which photoelectrically converts an optical image of an object and records the image as digital data. As shown in FIG. 1A, provided on the front surface of the image sensing apparatus 100 are an image sensing optical system 101, an entrance window 109-1 of an optical viewfinder, an electronic flash 121, a pink-eye mitigation lamp 123, a loudspeaker 138, and a wireless communication device 141. Provided on the upper surface of the image sensing apparatus 100 are a main switch 135-1 serving as a power switch and image sensing mode selection switch, a release switch 135-2, and an upper display 136 which is formed from a liquid crystal panel and displays various image sensing conditions. Provided on one side surface of the image sensing apparatus 100 are a USB (Universal Serial Bus) interface 142 so as to be able to communicate with a printer (to be described later) via a USB cable 152.

As shown in FIG. 1B, provided on the rear surface of the image sensing apparatus 100 are an eyepiece portion 109-2 of the optical viewfinder, a cross key switch 135-3, a set switch 135-4, a menu selection switch 135-5, selection switches 135-6 for various image sensing conditions, and a rear display 137 which is formed from a liquid crystal panel and displays an sensed image and various image sensing conditions. Provided on the other side surface of the image sensing apparatus 100 are a memory interface 143 to which a removable memory 151 is attached.

In FIG. 2, reference numeral 160 denotes a printer which converts input image information into an image signal to be output by an internal processing device and outputs a picture 154. Provided on the front surface of the printer 160 are a wireless communication device 161, a memory interface 163 for inserting the removable memory 151 which is inserted into the image sensing apparatus 100 and records a sensed image, and a CD drive 164 which receives a CD-ROM 153 on which image information is recorded. Provided on the upper surface of the printer 160 are operation switches 185, and an upper display 186 formed from a liquid crystal panel. Provided on the side surface are a USB interface 162 so as to be able to communicate with the image sensing apparatus 100 via the USB cable 152.

Figure 3:
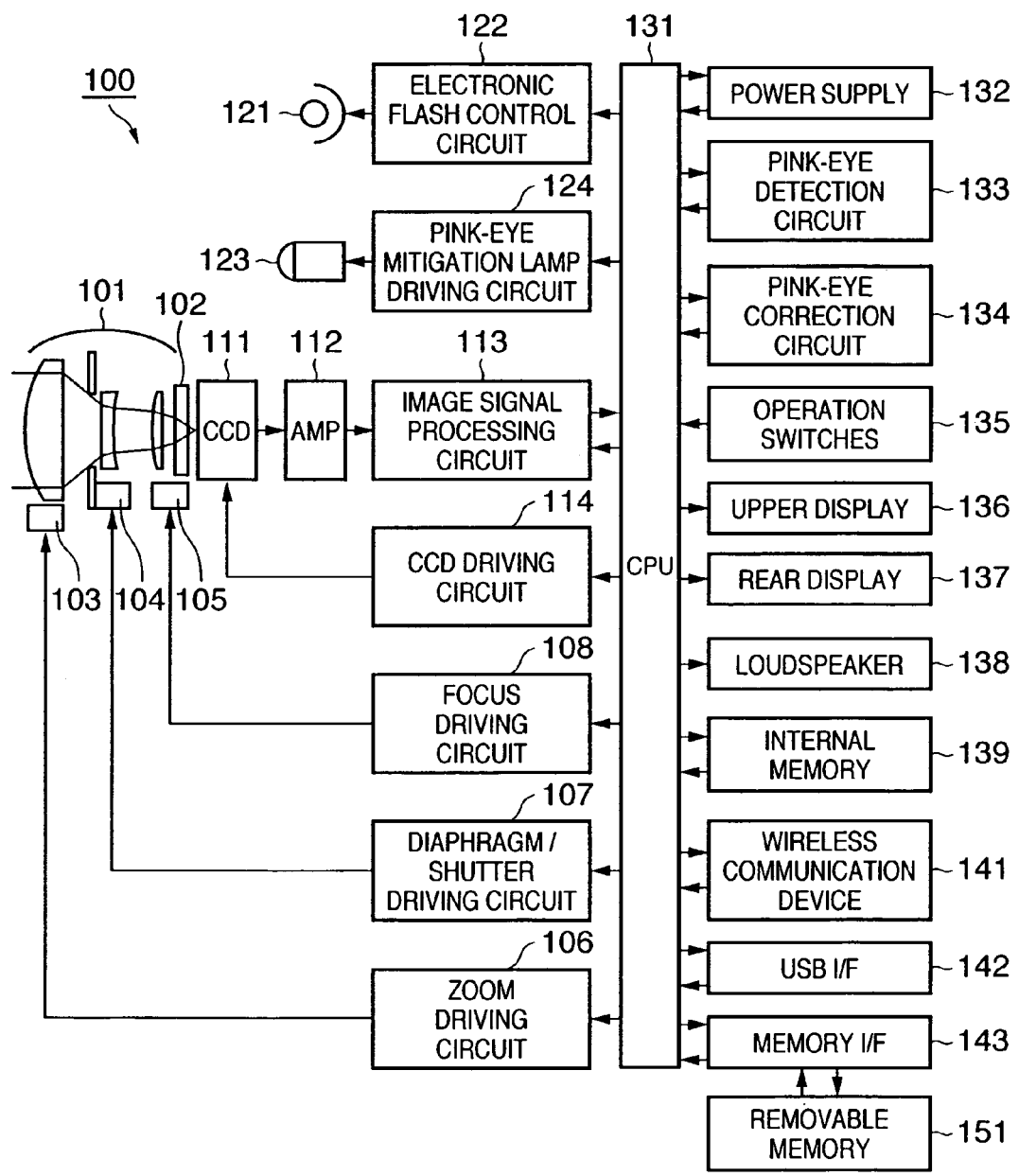
FIG. 3 is a block diagram showing the detailed configuration of the image sensing apparatus according to the embodiment of the present invention.

FIG. 3 is a block diagram showing the detailed functional configuration of the image sensing apparatus 100 in FIGS. 1A and 1B. The same reference numerals as in FIGS. 1A and 1B denote the same parts.

A beam from an object forms an image on an image sensor 111 including a photoelectrical conversion element such as a CCD via the image sensing optical system 101 and an optical low-pass filter 102. Reference numeral 103 denotes a zoom actuator which drives the variable-magnification lens of the imaging optical system 101, and is driven and controlled by a zoom driving circuit 106. Reference numeral 104 denotes a light quantity adjusting portion which is formed from an iris diaphragm and shutter, and is driven and controlled by a diaphragm/shutter driving circuit 107. Reference numeral 105 denotes a focus actuator which drives a focus lens, and is driven and controlled by a focus driving circuit 108.

Reference numeral 131 denotes a CPU which controls the operation of the overall image sensing apparatus 100, and is a one-chip microcomputer having a ROM, RAM, EEPROM, and A/D and D/A conversion functions. An object image formed on the image sensor 111 is converted into an electrical signal as the charge amount of each pixel that corresponds to the intensity of light incident on each pixel. The electrical signal is amplified by an amplifier circuit 112, undergoes a predetermined process such as γ correction by an image signal processing circuit 113, and is input to the CPU 131. The image signal A/D-converted within the CPU 131 undergoes a white balance process, edge enhancement, and if necessary, pink-eye correction (to be described later). The resultant image signal is JPEG-compressed and stored in the memory 151. Reference numeral 114 denotes a CCD driving circuit which controls charge accumulation and charge transfer of the image sensor 111.

The electronic flash 121 also shown in FIGS. 1A and 1B projects flash light in order to illuminate an object. Reference numeral 122 denotes an electronic flash control circuit which adjusts the flashing timing and quantity of light flashed by the electronic flash 121. The lamp 123 mitigates the pink-eye effect upon sensing an image with flashing the electronic flash 121. The lamp 123 emits steady light toward an object before sensing the objects, and the object person sees the steady light and narrows his/her pupil, mitigating the pink-eye effect. Reference numeral 124 denotes a driving circuit which ON/OFF-controls the lamp 123 for pink-eye mitigation.

Reference numeral 132 denotes a power supply which supplies power to the CPU 131 and various circuits and actuators within the image sensing apparatus 100. Reference numeral 133 denotes a pink-eye detection circuit which recognizes a person's face from a sensed image and detects whether the pink-eye effect occurs. The pink-eye detection circuit 133 is preferably, and not limited to, a dedicated processing circuit described in Japanese Patent Laid-Open No. 2002-358500 filed by the present applicant. The pink-eye detection function may be integrated as software in the CPU 131 or as hardware in the image signal processing circuit 113. Reference numeral 134 denotes a pink-eye correction circuit which corrects a pink-eye region detected by the pink-eye detection circuit 133 to a natural pupil color in accordance with a predetermined program. The correction method adopted at this time is, inter alia, a method described in Japanese Patent Laid-Open No. 10-233929 filed by the present applicant.

Reference numeral 135 denotes a variety of operation switches for designating the image sensing conditions, image sensing preparations, and an image sensing trigger of the image sensing apparatus 100, and including the switches 135-1 to 135-6 shown in FIG. 1B. The upper display 136 is arranged on the upper surface of the image sensing apparatus 100, and displays various image sensing conditions and the like on the liquid crystal panel. The rear display 137 is arranged on the rear surface of the image sensing apparatus 100, and displays a sensed image, various image sensing conditions, and the like on the liquid crystal panel. The loudspeaker 138 generates an alarm sound. An internal memory 139 stores various parameters used for a image sensing control program, and is also used as a frame memory when images in sequential shooting are temporarily saved or various operations are done for an image signal.

The wireless communication device 141 communicates with an external device such as a printer by infrared rays or radio, and wirelessly transfers an image signal and the like. The USB interface 142 exchanges image signals with an external device such as a printer via a USB cable. The memory interface 143 exchanges data with the removable memory 151. The removable memory 151 records a sensed image, and is preferably a nonvolatile flash memory, but may be a hard disk, magnetooptical disk, or the like.

Figure 4:
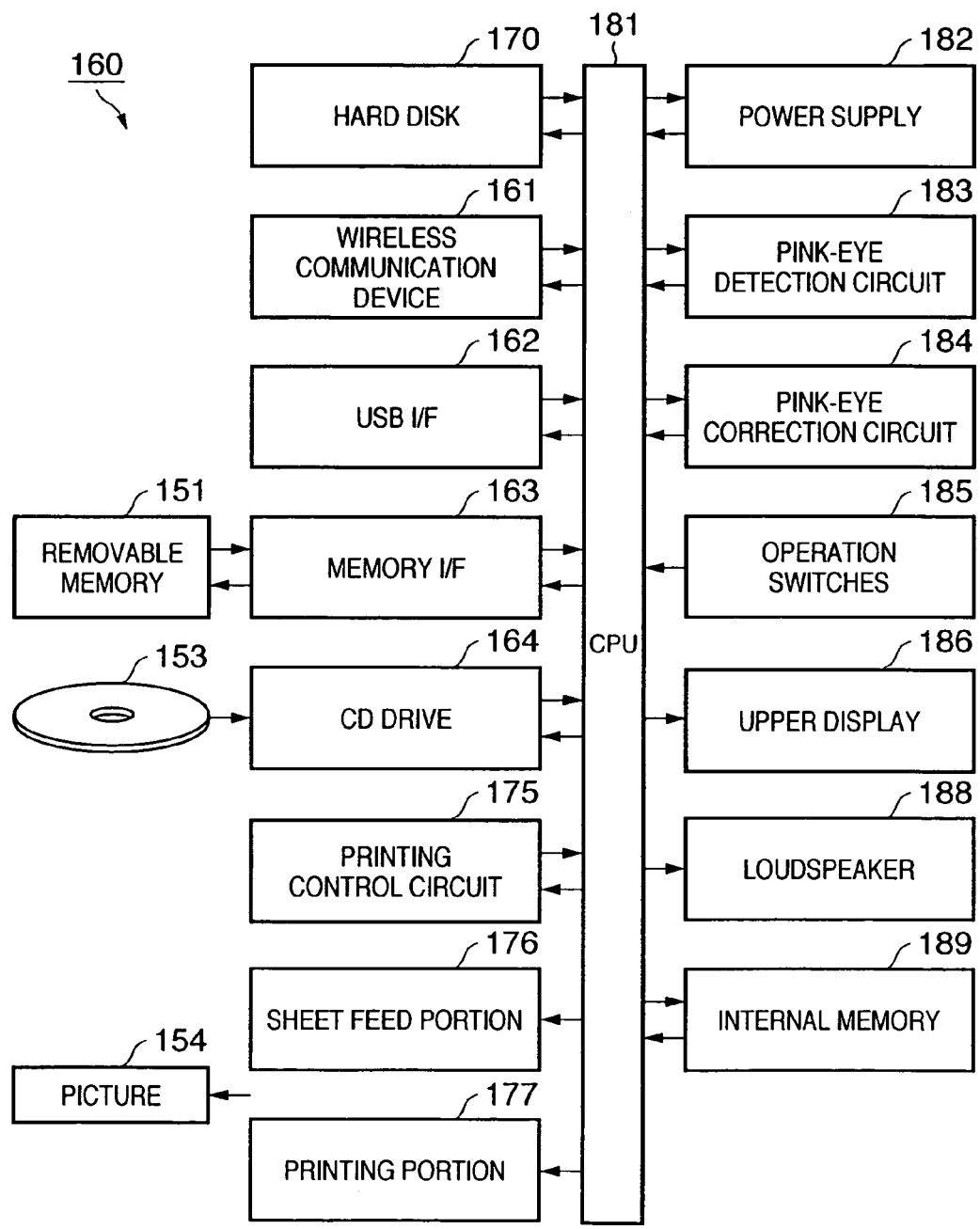
FIG. 4 is a block diagram showing the detailed configuration of the printer according to the embodiment of the present invention.

FIG. 4 is a block diagram showing the detailed functional configuration of the printer 160 shown in FIG. 2. The same reference numerals as in FIG. 2 denote the same parts.

Reference numeral 181 denotes a CPU which controls the operation of the printer 160 and is a controller having a ROM, RAM, EEPROM, and A/D and D/A conversion functions. Reference numeral 170 denotes a hard disk which stores various execution programs for communication with a digital camera, image printing, pink-eye correction, and the like, and stores data such as an image signal transmitted from a camera. The wireless communication device 161 communicates with an external device such as a camera by infrared rays or radio, and wirelessly receives an image signal and the like. The USB interface 162 exchanges image signals with a camera or the like via the USB cable 152. The memory interface 163 exchanges data with the removable memory 151 which records a sensed image. Reference numeral 151 denotes the removable memory shown in FIGS. 1A, 1B, and 3. When the removable memory 151 is inserted into the image sensing apparatus 100, a sensed image is recorded, and when the removable memory 151 is removed from the image sensing apparatus 100 and inserted into the printer 160, the recorded image is read out.

The CD drive 164 reads out various pieces of information including an image signal from the mounted CD-ROM 153, and transmits the contents to the CPU 181. Reference numeral 175 denotes a printing control circuit which rasterizes an image signal to be printed into print data, and drives and controls a printhead and sheet supply mechanism. Reference numeral 176 denotes a sheet feed portion which conveys a paper medium for printing an image; and 177, a printing portion including a printhead. By controlling the portions 175 to 177, an image signal is printed on a paper medium to discharge the picture 154.

Reference numeral 182 denotes a power supply which supplies power to the CPU 181 and various circuits and actuators within the printer 160. Reference numerals 183 and 184 denote a pink-eye detection circuit and pink-eye correction circuit, respectively, which are similar to the pink-eye detection circuit 133 and pink-eye correction circuit 134 of the image sensing apparatus 100. These circuits are used to perform pink-eye correction for an input image.

The various operation switches 185 set various printing modes and designate the start of printing. The upper display 186 is arranged on the upper surface of the printer, and displays various image sensing conditions, the thumbnail of an image to be printed, and the like on the liquid crystal panel. Reference numeral 188 denotes a loudspeaker which generates an alarm sound. Reference numeral 189 denotes an internal memory which stores various parameters used for a printing control program, and is also used as a temporary storage for an image signal received from the removable memory 151 and a temporary storage when an image is rasterized by the printing control circuit 175.

A sequence of setting image sensing conditions regarding pink-eye correction in the image sensing apparatus 100 will be explained with reference to FIGS. 5A to 5E.

When the main switch 135-1 of the image sensing apparatus 100 is turned on, the image sensing apparatus 100 is powered on, and the CPU 131 initializes various circuits and actuators in the image sensing apparatus 100. When image sensing becomes ready and the user presses the menu selection switch 135-5 in FIG. 1B, the rear display 137 displays the start page of a setting window for setting various image sensing conditions. The user selects a desired layer of image sensing conditions by operating the cross key switch 135-3.

FIG. 5A shows a start window when various conditions regarding image sensing with flash are set in the image sensing apparatus 100. This window displays sequentially from the top "electronic flash" for setting a flashing mode, "pink-eye correction" for setting whether to execute pink-eye correction and setting an execution device of the pink-eye correction, "image playback" for setting the display form of a pink eye-corrected image, and "image recording" for setting the recording form of a pink eye-corrected image. The user selects one of the items shown in FIG. 5A with the cross key switch 135-3, and presses the set switch 135-4. In response to this, one of windows in FIGS. 5B to 5E is displayed, and detailed conditions for the selected item can be set.

FIG. 5B shows the display window of a menu regarding the flashing mode. In the embodiment, three modes are available: an automatic flashing mode in which whether to flash light is automatically selected in accordance with the brightness of the object space, a forcible flashing mode in which light is always flashed regardless of the brightness of the object space, and a flashing inhibition mode in which flashing is always inhibited. In the automatic flashing mode and forcible flashing mode, whether to turn on the pink-eye mitigation lamp 123 can also be selected.

FIG. 5C shows the display window of a menu regarding whether to execute pink-eye correction and an execution device of the pink-eye correction. In the embodiment, three modes are available: an intra-camera correction mode in which pink-eye detection and pink-eye correction are performed by a processing circuit within the image sensing apparatus 100 after sensing an image with flash, an intra-printer correction mode in which pink-eye detection and pink-eye correction are performed by the printer 160 when printing an image, and a correction inhibition mode in which pink-eye correction is inhibited.

FIG. 5D shows the display window of a menu regarding the display form of a pink eye-corrected image within the image sensing apparatus 100. In the embodiment, three modes are available: a mode in which only an original image not subjected to pink-eye correction is displayed regardless of whether pink-eye correction has been executed ("only original image"), a mode in which when pink-eye correction is executed, a corrected image is displayed, and when no pink-eye correction is executed, an original image is displayed ("original image or corrected image"), and a mode in which a corrected image is also displayed subsequently to an original image when pink-eye correction is executed ("original image and corrected image").

FIG. 5E shows the display window of a menu regarding a method of recording a pink eye-corrected image within the image sensing apparatus 100. In the embodiment, three modes are available: a mode in which only an original image not subjected to pink-eye correction is recorded regardless of whether pink-eye correction has been executed ("only original image"), a mode in which when pink-eye correction is executed, a corrected image is recorded, and when no pink-eye correction is executed, an original image is recorded ("original image or corrected image"), and a mode in which a corrected image is also recorded in addition to an original image when pink-eye correction is executed ("original image and corrected image").

Figure 6:
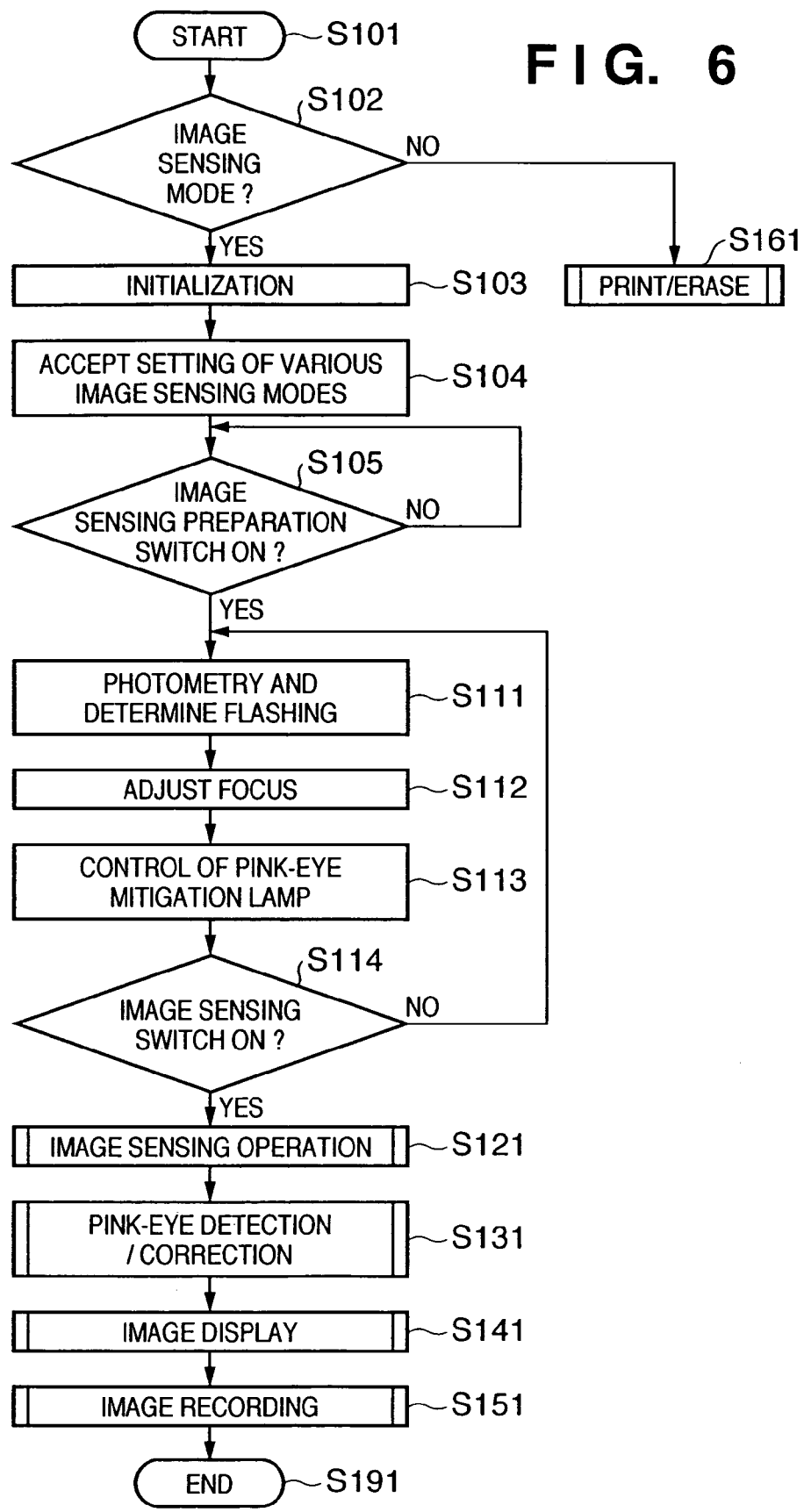
FIG. 6 is a flowchart showing a main control process in the image sensing apparatus according to the embodiment of the present invention.

FIG. 6 is a flowchart showing a main control process in image sensing operation in the image sensing apparatus 100. The outline of control will be explained along the flowchart of FIG. 6 with reference to FIGS. 1A to 5E.

In step S101, when the image sensing apparatus 100 is powered on, the process starts. The flow advances to step S102 to determine whether the image sensing mode is set. If NO in step S102, the current mode is determined to be a print designation/erasure mode. The flow advances to step S161 to designate printing and/or erasure of a sensed image. The process in step S161 will be described later with reference to FIGS. 13A to 13F and 14.

In the image sensing mode, the flow shifts to step S103 to perform initialization. More specifically, confirmation of the operation of various actuators within the image sensing apparatus 100 and return to initial positions are performed, and initial values are stored in the internal memory 139 used for control.

After initialization, in step S104, setting of various image sensing conditions such as the exposure control mode, AF mode, sequential shooting/single shooting mode, and white balance mode is permitted. Also, setting of a mode regarding the electronic flash in FIG. 5B is accepted.

In step S105, whether the image sensing preparation switch which is turned on by the first stroke (e.g., half stroke) of the release switch 135-2 has been turned on is determined. If NO in step S105, the flow stays in step S105 and waits till ON operation. If the image sensing preparation switch is turned on, processes in step S111 and subsequent steps are executed.

In step S111, the brightness of the object space is measured, and whether to flash light is determined on the basis of information on the flashing mode set using the menu as in FIG. 5B. In step S112, the focus is adjusted by a known method.

In step S113, whether to turn on the pink-eye mitigation lamp 123 is determined on the basis of information on the flashing mode set using the menu as in FIG. 5B. If a mode in which the lamp 123 is turned on has been selected, the pink-eye mitigation lamp 123 is turned on for a predetermined time. Accordingly, the pupil of a person in the object space narrows to mitigate the pink-eye effect.

In step S114, whether the image sensing switch which is turned on by the second stroke (e.g., full stroke) of the release switch 135-2 has been turned on is determined. If NO in step S114, the flow returns to step S111 to repetitively execute steps S111 to S113. If YES in step S114, processes in step S121 and subsequent steps are executed.

Figure 7:
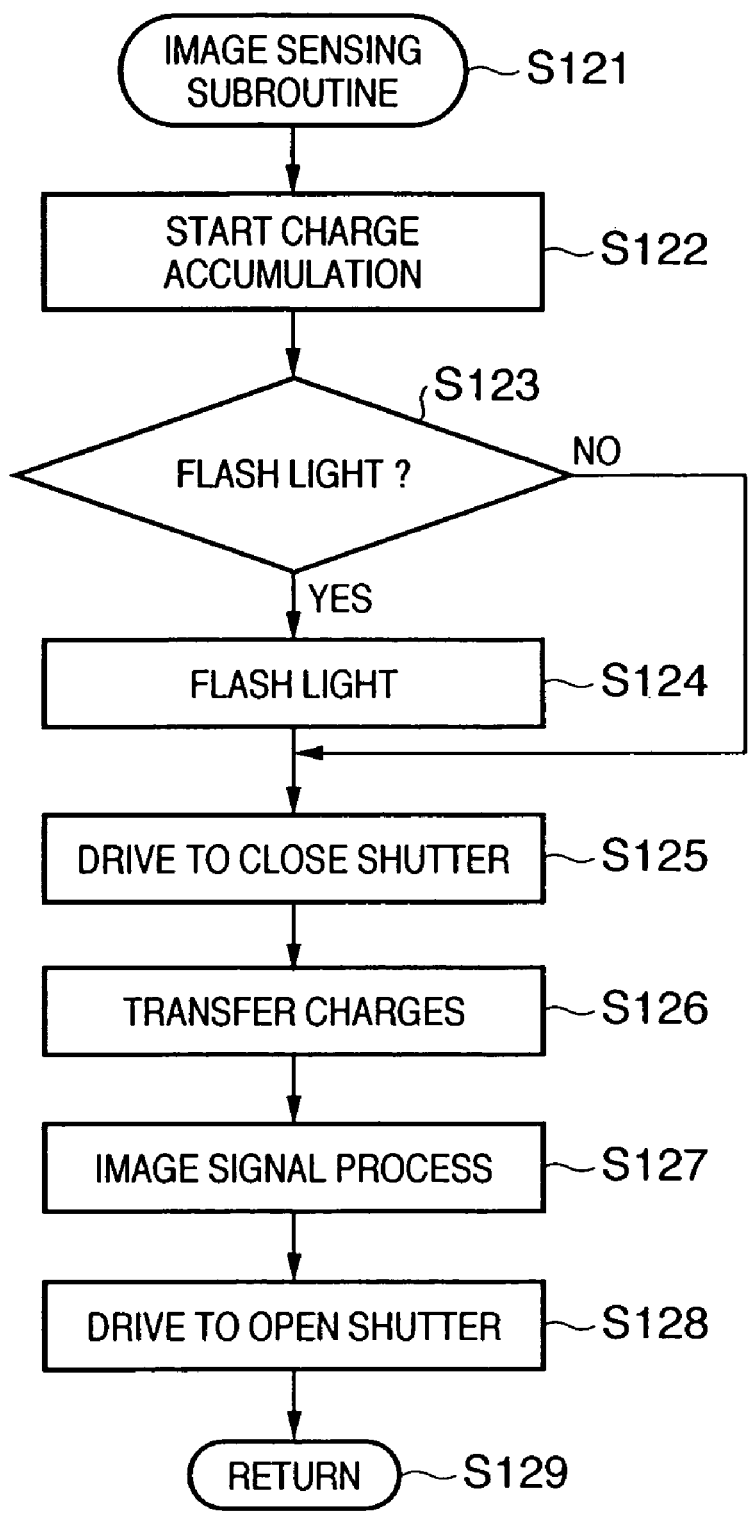
FIG. 7 is a flowchart showing an image sensing subroutine in the image sensing apparatus according to the embodiment of the present invention.

In step S121, an image sensing process is done, and after image sensing, the flow advances to step S131 to execute a pink-eye detection/correction process. An image display process is performed in step S141, and an image recording process is executed in step S151. The image sensing process executed in step S121 will be described in detail with reference to FIG. 7. The pink-eye detection/correction process executed in step S131 will be described in detail with reference to FIG. 8. The image display process executed in step S141 will be described in detail with reference to FIGS. 9 and 10A to 10C. The image recording process executed in step S151 will be described in detail with reference to FIGS. 11, 12A, and 12B.

After the image recording process in step S151 ends, image sensing is completed in step S191.

The processes in steps S121 to S151 will be explained in detail with reference to FIGS. 7 to 12B.

As described above, FIG. 7 is a flowchart showing the control process of the image sensing subroutine performed in step S121 of FIG. 6.

In step S122, charge accumulation in the image sensor 111 starts. Since the light quantity adjusting portion 104 (shutter) is open, charge accumulation newly starts by clearing charges accumulated in the image sensor 111 at a charge accumulation start timing. In step S123, whether to flash light is determined on the basis of photometry and the flashing determination result in step S111 of FIG. 6. If YES in step S123, a proper quantity of light is illuminated on the basis of a predetermined flash control program in step S124, and the flow advances to step S125. If NO in step S123, the flow directly advances from step S123 to step S125.

In step S125, the light quantity adjusting portion 104 (shutter) is driven to close upon the lapse of a predetermined time, and exposure to the image sensor 111 is stopped. Charges are transferred from the image sensor 111 in step S126, and a predetermined image process is done in step S127, completing acquisition of an image. In step S128, the light quantity adjusting portion 104 (shutter) is driven to open, and projection of an object image to the image sensor 111 restarts to prepare for the next image sensing. In step S129, the flow returns to the image sensing main flow in FIG. 6.

Figure 8:
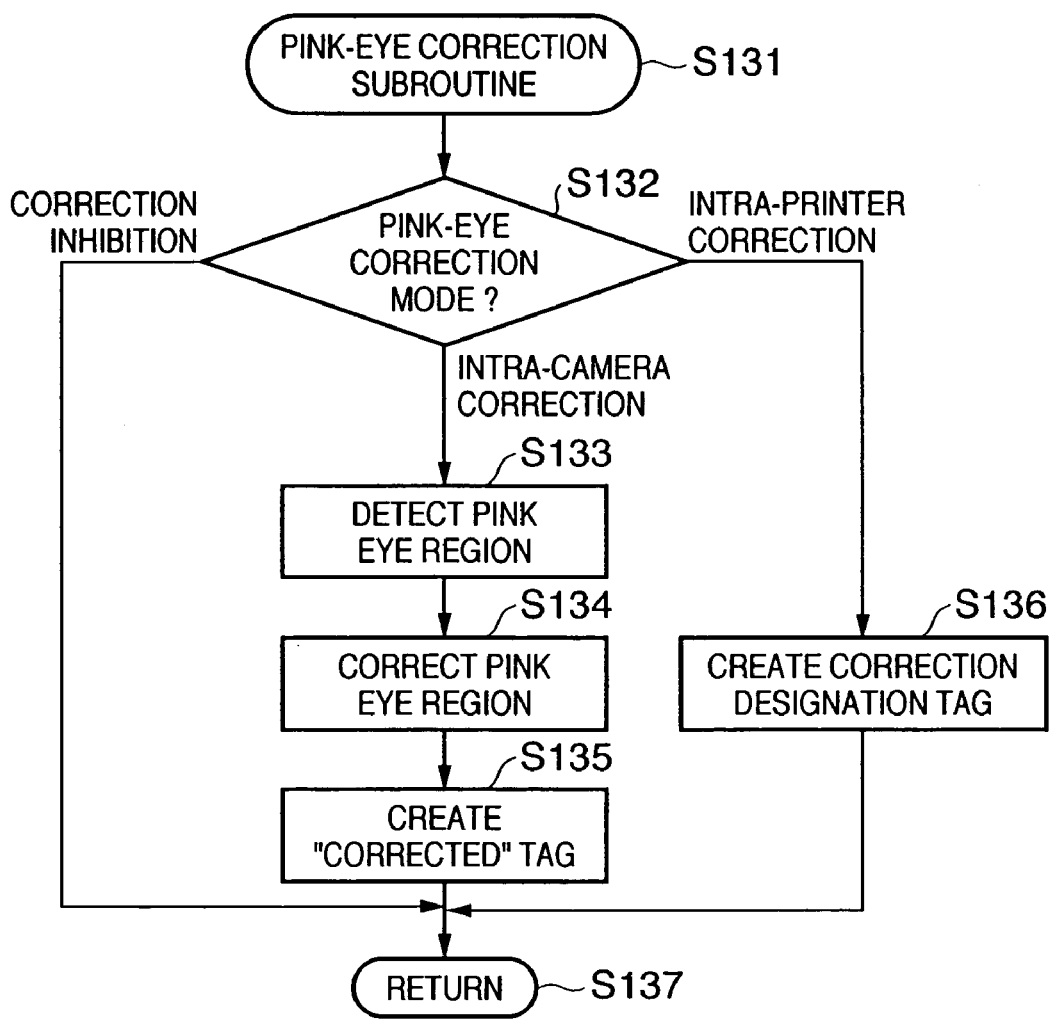
FIG. 8 is a flowchart showing a pink-eye correction subroutine in the image sensing apparatus according to the embodiment of the present invention.

FIG. 8 is a flowchart showing the control process of the pink-eye correction subroutine performed in step S131 of FIG. 6.

In step S132, a pink-eye correction mode which has been selected using the window shown in FIG. 5C in step S104 of FIG. 6 is determined. If correction inhibition has been selected, the flow advances to step S137 and returns to the main routine without performing any pink-eye correction.

If the intra-camera correction mode is determined to have been selected, the flow shifts to step S133 to detect a pink-eye region. More specifically, the pink-eye detection circuit 133 (FIG. 3) recognizes a person's face from a sensed image, detects whether the pink-eye effect occurs, and specifies the pink-eye region. In this case, the number of persons who suffer the pink-eye effect is simultaneously recognized. In step S134, the pink-eye region detected in step S133 is corrected to a natural pupil color by using the pink-eye correction circuit 134. In step S135, a tag representing that pink-eye correction has been executed and also representing the number of pink eye-corrected persons is created. In step S137, the flow returns to the main routine.

If the intra-printer correction mode is determined in step S132 to have been selected, the flow shifts to step S136 to create a tag which designates correction within the printer, and returns to the main routine in step S137.

As described above, the pink-eye correction subroutine can execute the pink-eye correction process in accordance with selection by the user. In the intra-camera correction mode, the image processing time after sensing an image becomes slightly long, but an image having reliably undergone pink-eye correction can be obtained regardless of the type of printer for use. The intra-printer correction mode requires a printer having a pink-eye correction function, but the sequential shooting speed in sequential shooting does not decrease because no pink-eye correction processing time after sensing images is required. Hence, the user can select a desired mode before sensing an image.

FIG. 9 is a flowchart showing the control process of the image display subroutine performed in step S141 of FIG. 6.

In step S142, an image display mode which has been selected using the window shown in FIG. 5D in step S104 of FIG. 6 is determined. If the mode in which only an original image is displayed has been selected, the flow advances to step S144 to display an original image which has not undergone pink-eye correction on the display 137 regardless of whether pink-eye correction has been executed, and returns to the main routine in step S149.

If the original image or corrected image display mode is determined in step S142 to have been selected, the flow shifts to step S143 to determine whether pink-eye correction has been executed for the sensed image. If no pink-eye correction has been executed, the flow shifts to step S144 to display the original image on the display 137, and returns to the main routine in step S149. If pink-eye correction has been executed for the sensed image, the flow shifts to step S145 to display the pink eye-corrected image on the display 137, and returns to the main routine in step S149.

If the original image and corrected image display mode is determined in step S142 to have been selected, the flow shifts to step S146 to display the original image on the display 137. The flow shifts to step S147 to determine whether pink-eye correction has been executed for the sensed image. If no pink-eye correction has been executed, the flow directly shifts to step S149 and returns to the main routine. If pink-eye correction has been executed for the sensed image, the pink eye-corrected image is displayed in step S148, and the flow returns to the main routine in step S149.

As described above, the image display subroutine can switch and execute, in accordance with selection by the user, the mode in which only one image is displayed after sensing an image and the mode in which two images before and after pink-eye correction are sequentially displayed. The former mode is suitable for sensing many pictures within a short time because a time necessary to display a sensed image is short. The latter mode can provide a higher-quality image because images before and after pink-eye correction can be compared and confirmed, and when pink-eye correction fails, a measure such as re-image sensing by prolonging the ON time of the pink-eye mitigation lamp 123 can be taken.

Figure 10A:
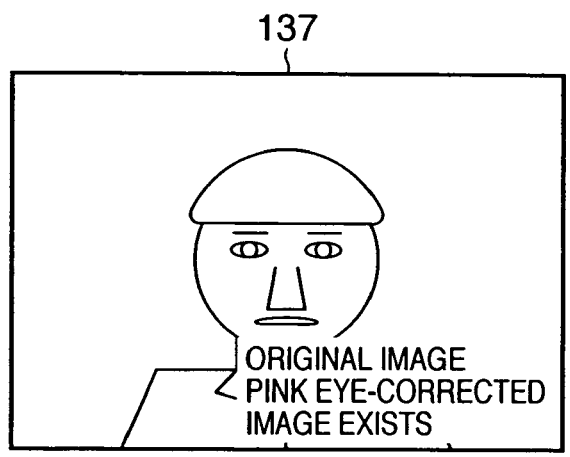
FIGS. 10A to 10C are views showing an example of the display form of a sensed image in the image sensing apparatus according to the embodiment of the present invention.
Figure 10B:
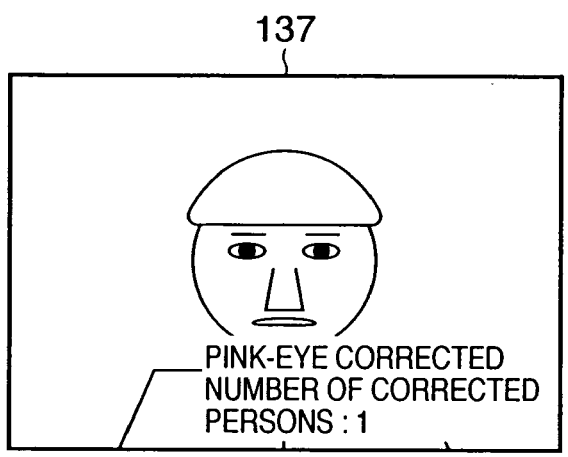
Figure 10C:
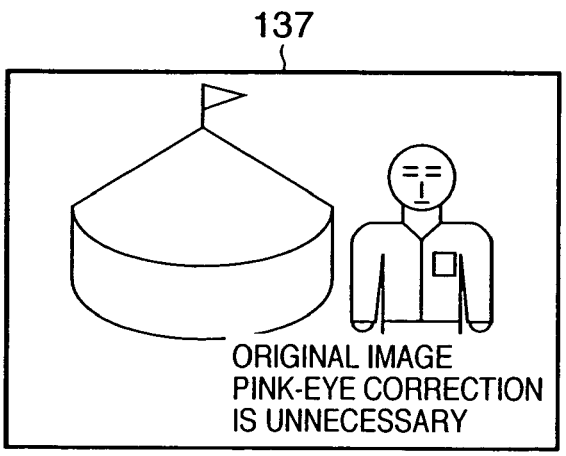

FIGS. 10A to 10C are views for explaining the display form of a sensed image displayed on the display 137 upon execution of the flow in FIG. 9.

FIG. 10A shows the display window of an original image not subjected to pink-eye correction. Together with the sensed original image, characters representing that the image is an original one and that a pink eye-corrected image of the original image has been created are displayed at a position (lower right portion of the window in the example of FIG. 10A) at which the image is not obstructed. This image is displayed upon execution of steps S144 and S146 in FIG. 9.

FIG. 10B shows the display window of a pink eye-corrected image. Together with the pink eye-corrected image, characters representing that the pink-eye correction process has been done, and the number of pink eye-corrected persons are displayed at a position (lower right portion of the window in the example of FIG. 10B) at which the image is not obstructed. Even on a display with a small display area, the user can confirm by character information whether pink-eye correction has been done and the number of pink eye-corrected persons, and can easily recognize the reliability of pink-eye correction. This image is displayed upon execution of steps S145 and S148 in FIG. 9.

FIG. 10C shows the display window of an image when an object different from that in FIG. 10A is sensed. Together with the sensed original image, characters representing that the image is an original one and that pink-eye detection has been performed but no pink-eye effect occurs and pink-eye correction is unnecessary are displayed at a position (lower right portion of the window in the example of FIG. 10C) at which the image is not obstructed. The user can confirm by character information whether pink-eye detection and pink-eye correction have not been done or whether pink-eye detection is performed and pink-eye correction is determined to be unnecessary, and can easily recognize the execution state of pink-eye correction. This image is displayed upon execution of steps S144 and S146 in FIG. 9.

FIG. 11 is a flowchart showing the control process of the image recording/display subroutine performed in step S151 of FIG. 6.

In step S152, an image recording mode which has been selected using the window shown in FIG. 5E in step S104 of FIG. 6 is determined. If the mode in which only an original image is recorded has been selected, the flow advances to step S154 to record an original image not subjected to pink-eye correction on the removable memory 151 regardless of whether pink-eye correction has been executed, and returns to the main routine in step S159.

If the original image or corrected image recording mode is determined in step S152 to have been selected, the flow shifts to step S153 to determine whether pink-eye correction has been executed for the sensed image. If no pink-eye correction has been executed, the flow shifts to step S154 to record the original image on the removable memory 151, and returns to the main routine in step S159. If pink-eye correction has been executed for the sensed image, the flow shifts to step S155 to record the pink eye-corrected image on the removable memory 151, and returns to the main routine in step S159.

If the original image and corrected image recording mode is determined in step S152 to have been selected, the original image is recorded in the removable memory 151 in step S156. The flow shifts to step S157 to determine whether pink-eye correction has been executed for the sensed image. If no pink-eye correction has been executed, the flow directly shifts to step S159 and returns to the main routine. If pink-eye correction has been executed for the sensed image, the pink eye-corrected image is also recorded in the removable memory 151 in step S158, and the flow returns to the main routine in step S159.

As described above, the image recording subroutine can switch and execute, in accordance with selection by the user, the mode in which only one image is recorded and the mode in which two images before and after pink-eye correction after sensing an image are sequentially recorded. The former mode is suitable for sensing many pictures because the recording capacity of sensed images does not increase. The latter mode can improve the convenience and the degree of freedom for using images because both an original image and pink eye-corrected image can be recorded and saved.

FIGS. 12A and 12B are views for explaining the contents of so-called tags which are recording information of a sensed image recorded in the removable memory 151 upon executing the process shown in FIG. 11. There are proposed various digital image file formats. For example, in Exif (Exchangeable Image File Format), information regarding image sensing conditions and the characteristics of an image and a thumbnail image are added to a JPEG-compressed main image. For example, the CIFF (Camera Image File Format) standard defines the structures of an individual image file and a folder for storing it, the naming convention, and the like.

FIGS. 12A and 12B show additional information of an image recorded in accordance with these standards. An image file IMA__0001.JPG in FIG. 12A shows information of an original image which has undergone only pink-eye detection but has not undergone pink-eye correction. An image file IMB__0001.JPG in FIG. 12B shows information of a pink eye-corrected image of the original image shown in FIG. 12A. In FIGS. 12A and 12B, the version and image data characteristic in the tag name column are standard data defined by Exif or the like. Pieces of information at the maker's note following user information represent pieces of information which can be freely defined by the camera maker (manufacturer). In the embodiment, information on pink-eye correction is recorded at the maker's note. The contents of information on pink-eye correction will be described.

Pink-eye detection software represents the type and version of pink-eye detection software installed in the image sensing apparatus 100. The number of pink eye-detected persons is the number of pink-eye persons detected by applying this software to a sensed image. The reliability is the reliability of a pink-eye detection result, and when the pink eyes of a plurality of persons are detected, a value corresponding to a person whose reliability is the lowest is recorded. When pink-eye detection is not executed, "none" is recorded in these fields.

Pink-eye correction software represents the type and version of pink-eye correction software installed in the image sensing apparatus 100. The number of pink eye-corrected persons is the number of pink-eye persons corrected by applying this software to a sensed image. The reliability is the reliability of a pink-eye correction result, and when the pink eyes of a plurality of persons are corrected, a value corresponding to a person whose reliability is the lowest is recorded. When pink-eye correction is not executed, "none" is recorded in these fields.

The type of image records whether a recorded image is an original image not subjected to pink-eye correction or a pink eye-corrected image. The presence/absence of a relevant image records whether a relevant image based on the same sensed image exists. For example, "corrected image exists" is described for IMA__0001.JPG in FIG. 12A, which means that the current image is an original one and a pink eye-corrected image further exists. "Original image exists" is described for IMB__0001.JPG in FIG. 12B, which means that the current image is a corrected one and an original image further exists.

As described above, pieces of additional information on pink-eye correction is recorded for a sensed image. By referring to these pieces of information in editing or printing a recorded image, erroneous correction in correcting a pink eye again or printing of an unnecessary image can be prevented.

FIGS. 13A to 13F are views showing windows displayed on the display 137 in executing the print/erase process performed in step S161 of FIG. 6. The sequence of the print/erase process will be explained with reference to FIGS. 13A to 13F.

FIG. 13A shows the first window in setting conditions regarding print or erase of a sensed image. Items for setting DPOF (Digital Print Order Format) print, camera direct print, and erase are displayed sequentially from the top. When the user selects one of the items shown in FIG. 13A with the cross key switch 135-3 and presses the set switch 135-4, windows in FIGS. 13B to 13F are displayed, and he/she can set detailed conditions for the selected item.

FIG. 13B shows the display window of a menu regarding designation of a print image in DPOF print. DPOF is a standard for automatic print of a digital image, and the present invention is not limited to this. When an item within the window is selected, a DPOF information file is generated in the removable memory 151, and the following print designation information is recorded.

When "only original image" is selected, additional information of an image recorded in the removable memory 151 is searched for, and images which are designated as original images by the type of image in the pink-eye correction-associated information shown in FIGS. 12A and 12B are designated at once as images to be printed. When "original image or corrected image" is selected, additional information of an image recorded in the removable memory 151 is similarly searched for, and either original images or corrected images are designated at once as images to be printed by referring to the type of image and the presence/absence of relevant images in the pink-eye correction-associated information shown in FIGS. 12A and 12B. In this case, corrected images are given priority over original images, and original images are designated to be printed when no corrected images corresponding to the original images exist. When "original image and corrected image" is selected, all images recorded in the removable memory 151 are designated at once as images to be printed. When "individual designation" is selected, all images recorded in the removable memory 151 are displayed in an order of file numbers, and whether to print is set for each image.

FIG. 13C shows an example of a window for designating an output format with which an image designated in FIG. 13B is printed. When "Standard" is selected, each image is individually printed on a sheet of a predetermined size (e.g., L size). When "Index" is selected, the thumbnail images of all images designated to be printed are printed at once on a sheet of a predetermined size. When "Both" is selected, printing is done by both "Standard" and "Index".

FIG. 13D shows an example of the display window of a menu regarding designation of a print image in camera direct print. Camera direct print represents a method of directly connecting a digital camera and printer via a USB cable or the like and directly designating printing from the camera to the printer. This method corresponds to, e.g., a standard Pict Bridge defined by Camera & Imaging Products Association (CIPA). However, the method is not limited to this, and may be a standard uniquely defined by a camera manufacturer or printer manufacturer. When the image sensing apparatus 100 and printer 160 are connected via USB cable 152, as described above with reference to FIGS. 1A, 1B, and 2, and an item within the window shown in FIG. 13D is selected, print information corresponding to the contents is transmitted to the printer. The designation contents of an image to be printed are the same as those for DPOF in FIG. 13B, and a description thereof will be omitted.

FIG. 13E shows a window for designating an output format with which an image designated in FIG. 13D is printed. When "L" is selected, an image is individually printed on an L-size sheet. As for "2L" and "Card", an image is individually printed on a sheet of a predetermined size. When "A4 Index" is selected, the thumbnail images of all images designated to be printed are printed at once on an A4-size sheet.

FIG. 13F shows the display window of a menu for erasing an image. When "original images/batch" is selected, additional information of images recorded in the removable memory 151 is searched for, and images which are designated as original images by the type of image in the pink-eye correction-associated information shown in FIGS. 12A and 12B are erased at once. When "corrected images/batch" is selected, additional information of images recorded in the removable memory 151 is similarly searched for, and corrected images are erased at once. When "all images/batch" is selected, all images recorded in the removable memory 151 are erased at once. When "individual erase" is selected, all images recorded in the removable memory 151 are displayed in an order of file numbers, and whether to erase an image is determined for each image by the user.

FIG. 14 is a flowchart showing a control process in the image print/erase mode shown in FIGS. 13A to 13F. This process is a subroutine executed in step S161 of FIG. 6.

In step S162, which of the items "DPOF", "camera direct print", and "erase" shown in FIG. 13A is a mode selected by the user is determined. If the selected mode is DPOF, the flow shifts to step S163.

In step S163, the window in FIG. 13B is displayed to accept selection of an image to be printed. In step S164, the window in FIG. 13C is displayed to accept selection of the output format of the image to be printed. In step S165, the results selected in steps S163 and S164 are recorded in a print designation file. In step S172, print designation ends.

In step S162, if the mode selected by the user is camera direct print in FIG. 13A, the flow shifts to step S166. In step S166, the window in FIG. 13D is displayed to accept selection of an image to be printed. In step S167, the window in FIG. 13E is displayed to accept selection of the output format of the image to be printed. In step S168, the results selected in steps S166 and S167 are transmitted to the printer. In step S172, print designation ends.

In step S162, if the mode selected by the user is erase in FIG. 13A, the flow shifts to step S169. In step S169, the window in FIG. 13F is displayed to accept selection of an image to be erased. In step S170, a warning is generated before executing erase of the image. If the user turns on the set switch 135-4, the selected image is erased in step S171, and erase of the image ends in step S172.

As described above, by executing the image print/erase subroutine according to the embodiment, print designation or erase can be executed at once or individually for an original image and pink eye-corrected image.

Figure 15C:
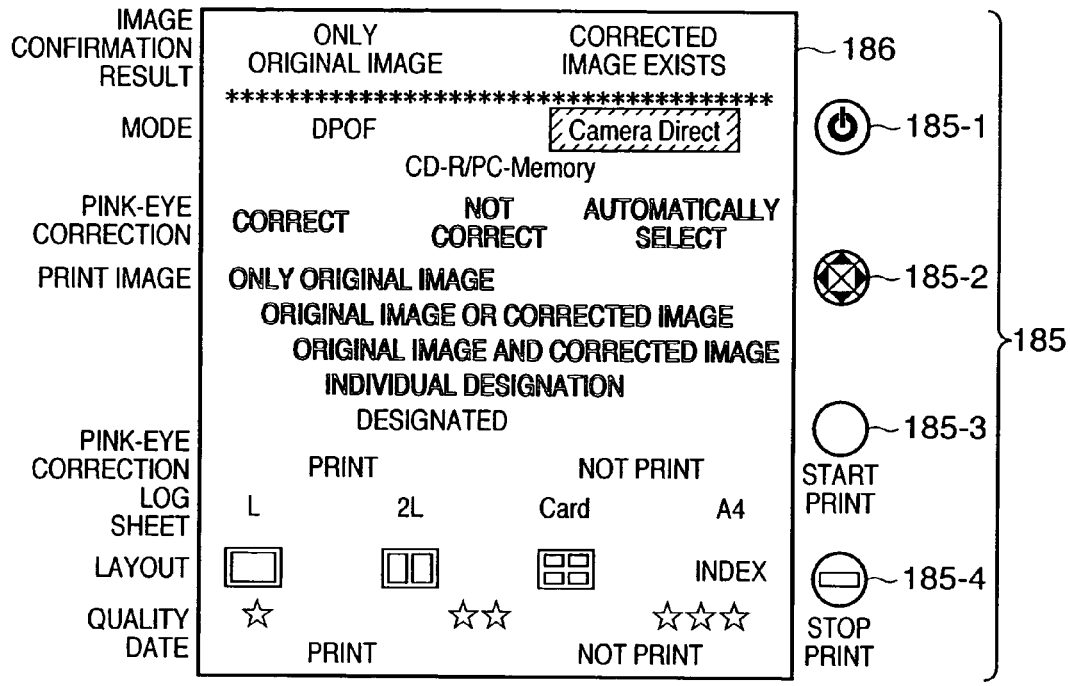
Figure 15D:
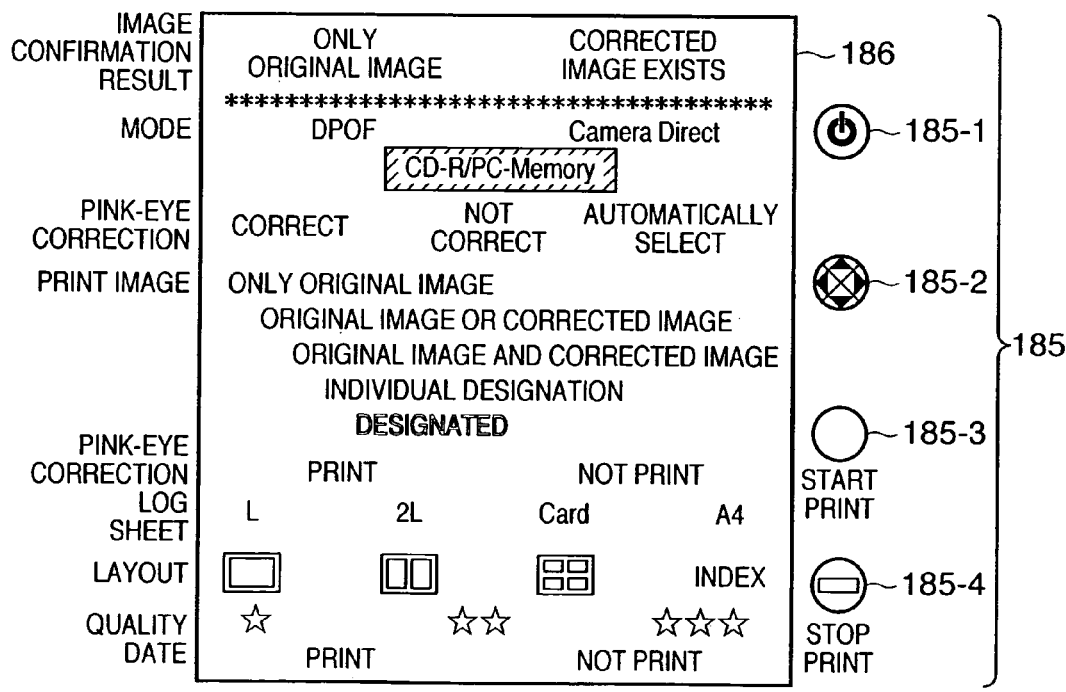

FIGS. 15A to 15D are views for explaining a print condition setting method when the printer 160 prints a sensed image. FIG. 15A shows members arranged on the upper surface of the printer 160 in FIG. 2. The operation switches 185 including, e.g., a power switch 185-1, cursor switch 185-2, print start switch 185-3, and print stop switch 185-4 are arranged near (right side in the example of FIG. 15A) the upper display 186. As shown in FIG. 15A, the display 186 displays all menus in an initial state. In print operation, as shown in FIGS. 15B to 15D, selectable menus are displayed by bold characters or icons, and unselectable menus are displayed by grayed-out characters or icons. The contents of the menus will be explained.

The "image confirmation result" displays whether a print image input to the printer 160 is only an original image or contains a pink eye-corrected image. The "mode" is a menu for selecting DPOF print, camera direct print, or print of a general-purpose image recorded on a memory such as a CD-R. The "pink-eye correction" is a menu for setting whether to perform pink-eye correction for a print image by using a pink-eye correction function incorporated in the printer 160. The "print image" is a menu for selecting the type of image to be printed. The "pink-eye correction log" is a menu for selecting whether to print in a predetermined region of an image to be printed whether pink-eye correction has been done and the type and version of pink-eye correction software used. The "sheet" is a menu for selecting the size of a print sheet. The "layout" is a menu for selecting the layout of an image to be printed on a print sheet. The "quality" is a menu for selecting the print quality, and a larger number of stars represents a higher quality but requires a longer print time. The "date" is a menu for selecting whether to print a sensed time and date in a predetermined region of an image to be printed.

FIG. 15B is a view for explaining an operation method when DPOF print is executed. The operation method will be explained by also referring to FIGS. 2 and 4.

When the user turns on the power switch 185-1 of the printer 160, the printer 160 is powered on, and the CPU 181 initializes various circuits and actuators within the printer 160 and prepares for printing. The user removes the removable memory 151 from the image sensing apparatus 100, and inserts it into the printer 160. The CPU 181 then reads out recorded images and a DPOF file from the removable memory 151 via the memory interface 163, and analyzes the contents. When the recorded images include pink eye-corrected images, "corrected image exists" is displayed in the "image confirmation result".

When the user selects DPOF from the "mode", the printer 160 changes menus selectable in DPOF print to active display (bold display), and unselectable menus to inactive display (grayout display). As for whether to execute "pink-eye correction", execution of pink-eye correction in the printer 160 cannot be selected. Also, as for selection of the "print image", an image has already been designated on the camera side, "designated" is displayed, and selection in the printer is inhibited. The "pink-eye correction log" allows selecting whether to print the correction log. The "sheet" allows selecting all sizes, and the "layout" actively displays a layout set by the image sensing apparatus 100. The "quality" allows selecting all qualities, and the "date" allows selecting whether to print or not a time and date.

As described above, in DPOF print, whether to execute pink-eye correction and whether to print a pink eye-corrected image can be selected in only the image sensing apparatus 100, and selection of them in the printer is inhibited. Hence, only a few items are selected in the printer 160, and no cumbersome operation need be performed in printing.

FIG. 15C is a view for explaining an operation method when camera direct print is executed. In camera direct print, the user connects the image sensing apparatus 100 and printer 160 via the USB cable 152, and performs print operation by using the display 137 and operation switches of the image sensing apparatus 100. The operation method in the printer 160 is almost the same as that in DPOF print described with reference to FIG. 15B, and a detailed description thereof will be omitted.

FIG. 15D is a view for explaining an operation method in a medium print mode in which a general-purpose image recorded on a memory medium such as a CD-R without any DPOF information is printed. When the user mounts a CD-R or PC memory storing images in the printer 160, the CPU 181 reads out the recorded images via the CD drive 164 or memory interface 163, analyzes the contents, and displays the presence/absence of a pink eye-corrected image as the "image confirmation result". The user selects the following menus on the basis of the display result.

The operation proceeds on the assumption that the user prints a general-purpose image using no DPOF information. When the user selects memory medium print from the "mode", as shown in FIG. 15D, the printer 160 changes menus selectable in printing in this mode to active display (bold display), and unselectable menus to inactive display (grayout display). As for whether to execute "pink-eye correction", whether to execute pink-eye correction in the printer 160 can be selected. When the user selects a mode in which pink-eye correction is executed, all images input to the printer 160 are searched for images not having undergone pink-eye correction, and pink-eye detection and pink-eye correction are executed. When the user selects a mode in which no pink-eye correction is executed, pink-eye correction in the printer 160 is not executed. When the user selects an automatic selection mode, pink-eye correction is done for images designated to undergo pink-eye correction in the printer. That is, in the operation by the image sensing apparatus 100 described with reference to FIG. 5C, printer correction designation information is added to image tag information of an image sensed with a mode in which pink-eye correction is performed in the printer.

In the "print image" selection menu column, which of an original image and corrected image is printed is selected. If only an original image is selected, only the original image is printed. When an original image or corrected image is selected, only a corrected image is printed for an image for which both the original image and corrected image exist, and an original image is printed for an image for which only the original image exists. When an original image and corrected image are selected, all images, i.e., both an original image and corrected image are printed. When the individual designation mode is selected, the thumbnails of images are sequentially displayed on the display 186, and whether to print can be selected for each image. The contents of modes subsequent to the "pink-eye correction log" are the same as the description of FIG. 15B, and a description thereof will be omitted.

In this manner, in memory medium print, whether to execute pink-eye correction and whether to print a pink eye-corrected image can be selected on the printer side. Even for an image sensed with a camera having no pink-eye correction function, a pink eye-corrected image can be printed. By selecting a desired mode in the "print image", whether to print all images or a minimum number of needed images can be selected. Printing coping with the user's will can prevent wasteful consumption of print sheets.

Figure 16:
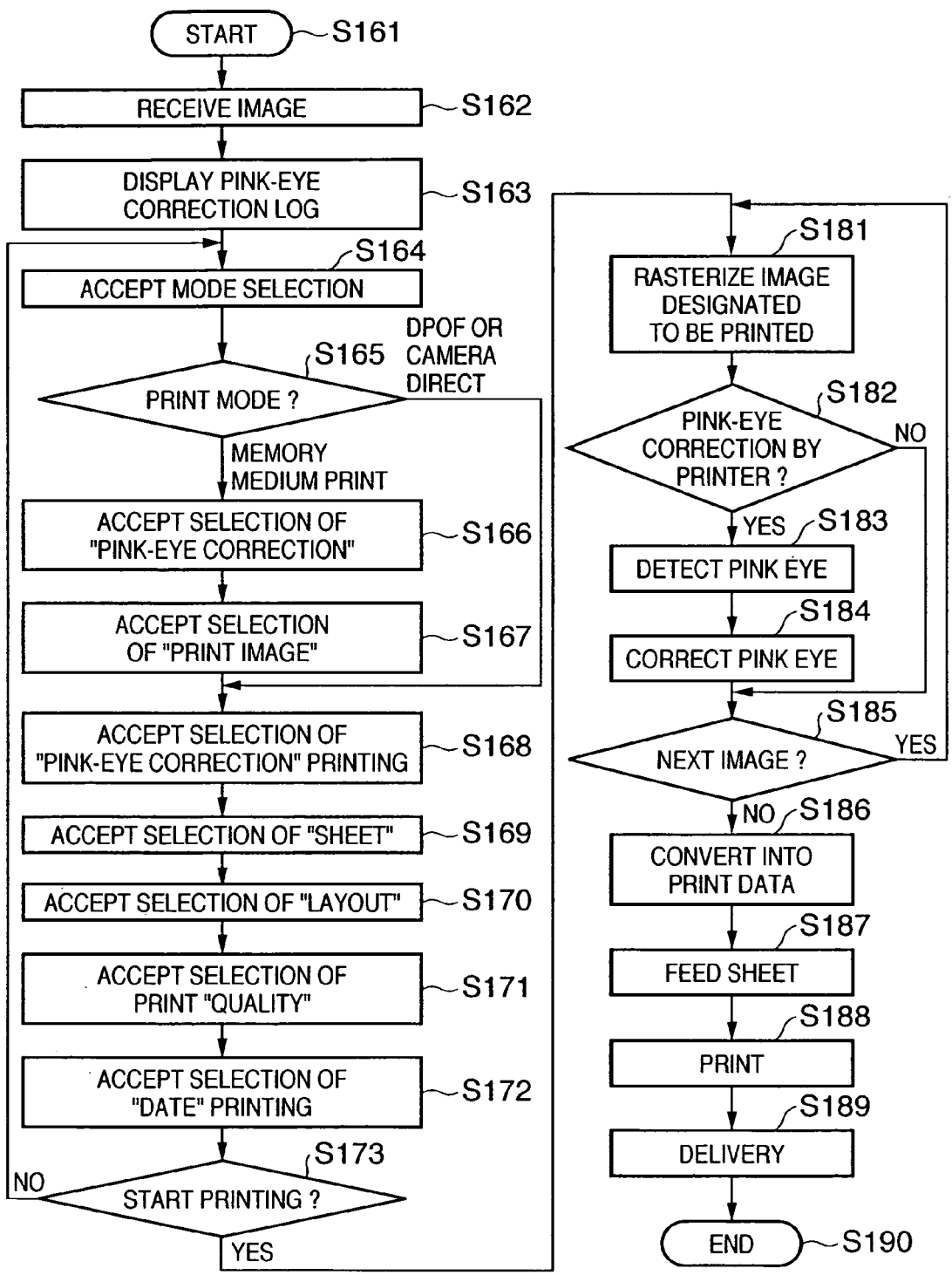
FIG. 16 is a flowchart showing a main control process in the printer according to the embodiment of the present invention.

FIG. 16 is a flowchart showing a main control process when setting of various modes and printing are executed in the printer 160. The control process will be explained by also referring to FIGS. 2, 4, 15A to 15D.

When the printer 160 is powered on, the main control of the printer starts in step S161, and an image is received from an image recording medium mounted in the printer 160. In step S163, additional information of the received image is analyzed to determine the pink-eye correction log, and the result is displayed as an image confirmation result on the display 186. In step S164, selection from the "mode" displayed on the display 186 is accepted. In step S165, the selected mode is determined, and if the memory medium print mode is selected, the flow shifts to step S166 to accept selection of "pink-eye correction" in the printer and accept selection of the "print image" in step S167. If the selected mode is determined in step S165 to be DPOF or camera direct, pink-eye correction and a print image have been selected in the image sensing apparatus 100, and thus the flow skips steps S166 and S167 in the printer 160 and jumps to step S168.

In step S168, selection of printing the "pink-eye correction log" displayed on the display 186 is accepted. Selection of the "sheet selection" item, selection of the "layout" item, selection of the "print quality" item, and selection of the "date printing" item are accepted in steps S169, S170, S171, and S172, respectively.

In step S173, whether the print start switch 185-3 has been pressed is determined, and if NO, the flow returns to step S164 to keep accepting setting of various modes. If YES in step S173, the flow shifts from step S173 to step S181.

In step S181, the printing control circuit 175 rasterizes an image designated to be printed. For example, image data recorded by the JPEG standard is rasterized into an RGB bitmap image. In step S182, the pink-eye correction mode in the printer 160 that is selected in step S166 is determined, and if no pink-eye correction is to be executed, the flow jumps to step S185. If pink-eye correction is to be executed in the printer 160, the flow shifts to step S183 to detect a pink-eye region within the image by the pink-eye detection circuit 183. In step S184, pink-eye correction is done by the pink-eye correction circuit 184.

In step S185, whether the next image to be printed exists is determined, and if YES, steps S181 to S184 are repetitively executed. If rasterization and pink-eye correction of all print images are completed, the flow shifts from step S185 to step S186. In step S186, bitmap image data is converted into print dot data to be printed. A print sheet on the tray is fed to the printing portion 177 in step S187, data is printed in step S188, the print sheet is discharged from the printer in step S189, and printing ends in step S190.

Figure 17:
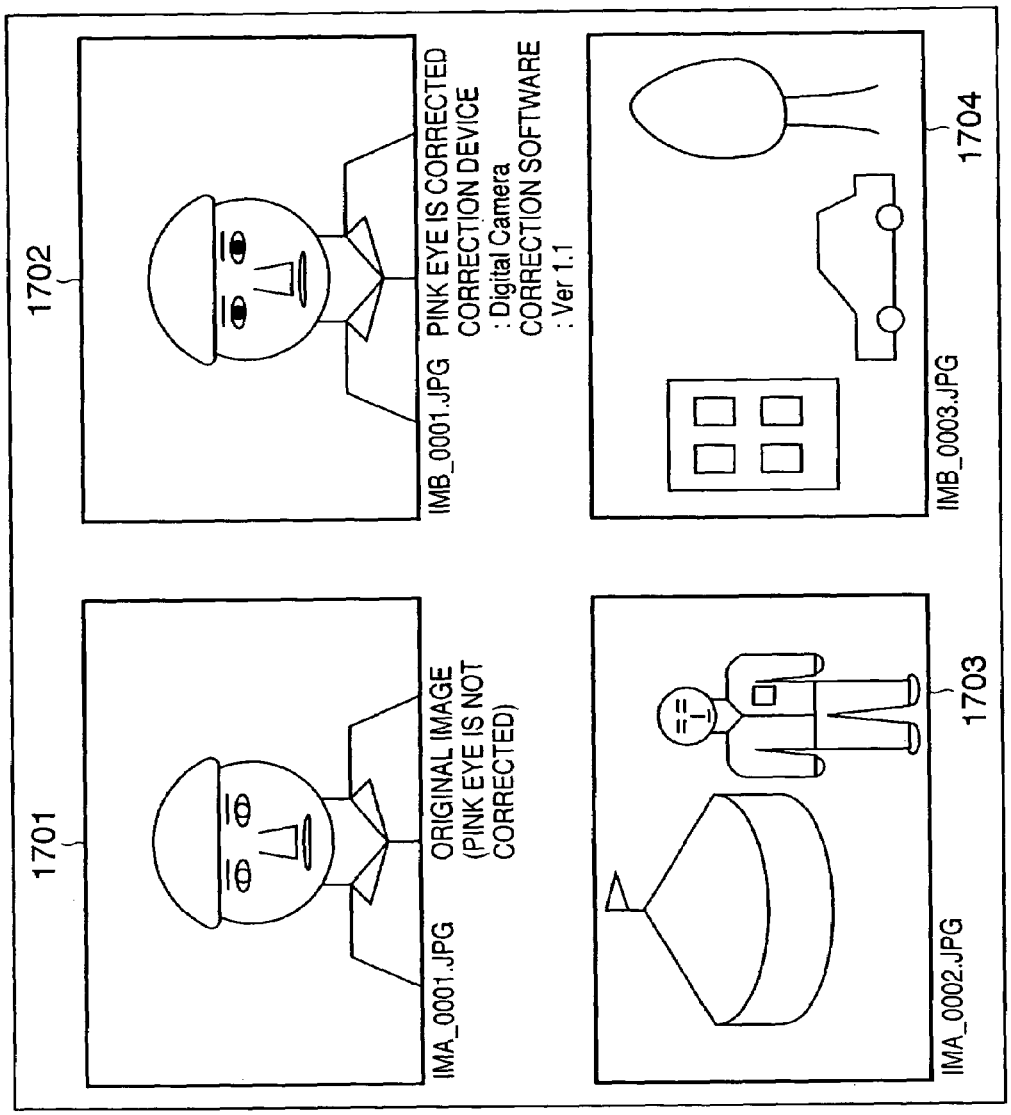
FIG. 17 is a view showing an example of a photographic print obtained by the printer according to the embodiment of the present invention.

FIG. 17 shows an example of a photographic print obtained by executing the control process in FIG. 16. Four frames (1701 to 1704) of sensed images are printed on an A4-size landscape sheet. The upper left image 1701 is an image of a person sensed with an electronic flash. A file name "IMA_0001.JPG" and characters "original image (pink eye is not corrected)" representing that no pink-eye correction is done are printed below the image 1701. The upper right image 1702 is an image obtained by performing pink-eye correction for the original image. A file name "IMB_0001.JPG", information "pink eye is corrected" representing that pink-eye correction has been done, the name of a digital camera as a device which has executed pink-eye correction, and the type and version of pink-eye correction software are printed below the image. By printing such character information, the user can easily determine whether the current image is a pink eye-corrected image and what kind of software was used for correction.

An original image and a corrected image as a copy of the original image can also be determined by changing the alphabet parts of the file names of the original image and corrected image while keeping the numerical parts unchanged.

As described above, by using the printer according to the embodiment, an image having undergone pink-eye correction within the camera can be directly printed, and an image not subjected to pink-eye correction can be printed after performing pink-eye correction within the printer. Also when printable images include both original images and pink eye-corrected images, only necessary images are automatically extracted and printed by selecting a print image mode by the user. Hence, a desired image can be printed by simple operation.

OTHER EMBODIMENTS

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-399746 filed on Nov. 28, 2003, which is hereby incorporated herein by reference herein.

What is claimed is:

1. An image sensing apparatus comprising:
an image sensor that acquires an image of an object as an image signal;
a selection unit that selects before image sensing whether to perform a red-eye correction for the image of the object acquired by said image sensor;

a red-eye correction unit that detects a red-eye from the image of the object and corrects the detected red-eye if performing of the a red-eye correction is selected by said selection unit;

a display unit that displays an image;

a display control unit that controls said display unit to display a predetermined information for identifying whether a displayed image is a red-eye corrected image or an original image of the object, to display character information indicating the number of people whose red-eye/eyes are corrected in a case where the red-eye corrected image is displayed, and in a case where the original image of the object is displayed, to display either of character information indicating that a red-eye corrected image has been generated, or information indicating that said red-eye correction unit did not perform the red-eye detection and the red-eye correction, or character information indicating that said red-eye correction unit performed the red-eye detection; and a recording unit that holds the image of the object, wherein said selection unit can further select whether to record either of an original image or a red-eye corrected image on said recording unit or to record both of the original image and the red-eye corrected image.

2. The apparatus according to claim 1, wherein said selection unit can further select character information to be displayed on said display unit.

3. The apparatus according to claim 1, wherein said recording unit holds a process result of red-eye correction as additional information of the image of the object.

4. The apparatus according to claim 3, wherein said selection unit can further select whether to add the additional information to the image of the object.

5. A method of controlling an image sensing apparatus having an image sensor that acquires an image of an object as an image signal and a display unit that displays an image, comprising:

selecting before image sensing whether to perform a red-eye correction for the image of the object acquired by the image sensor;

detecting red-eye from the image of the object and correcting the detected red-eye if performing of the red-eye correction is selected;

displaying character information indicating that a displayed image is the red-eye corrected image or the original image of the object;

displaying character information indicating the number of people whose red-eye/eyes are corrected in a case where the red-eye corrected image is the displayed image;

displaying, if the original image of the object is displayed, either of character information indicating that red-eye corrected image has been generated, or information indicating that said red-eye correction did not perform the red-eye detection and the red-eye correction, or character information indicating that said red-eye correction unit performed the red-eye detection but did not perform the red-eye correction because the red-eye correction was unnecessary ;and recording the image of the object, wherein the selecting step can further select whether to record either of an original image or a red-eye corrected image in said recording step or to record both of the original image and the red-eye corrected image.

6. A storage medium readable by an information processing apparatus, storing a program for performing the steps defined in claim 5.

* * * * *